(12) United States Patent
Ishimura et al.

(10) Patent No.: US 7,127,530 B2
(45) Date of Patent: Oct. 24, 2006

(54) COMMAND ISSUING APPARATUS FOR HIGH-SPEED SERIAL INTERFACE

(75) Inventors: Isamu Ishimura, Kyoto (JP); Yoshihiro Tabira, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 643 days.

(21) Appl. No.: 10/124,265

(22) Filed: Apr. 18, 2002

(65) Prior Publication Data

US 2002/0156943 A1    Oct. 24, 2002

(30) Foreign Application Priority Data

Apr. 19, 2001  (JP)  ............................. 2001-120745

(51) Int. Cl.
  G06F 13/38   (2006.01)
  G06F 13/00   (2006.01)
  G06F 3/00    (2006.01)
(52) U.S. Cl. .................. 710/5; 710/6; 710/7; 710/20; 710/29; 710/36; 710/39; 710/52; 718/1; 718/100; 718/101; 718/102; 711/100; 711/154; 712/214; 712/215; 712/220; 712/245
(58) Field of Classification Search .................. 710/1, 710/5–7, 15, 18–20, 29, 36, 39, 52, 53, 56, 710/62–64, 72–74, 107, 112, 305, 306, 310, 710/311; 711/100, 104–105, 111, 112, 114, 711/154, 156; 712/214, 215, 220, 245; 709/1, 709/100, 101, 102; 718/245, 1, 100–102
See application file for complete search history.

(56) References Cited

U.S. PATENT DOCUMENTS 6,185,632 B1 *  2/2001  Berkema .................... 710/20
6,205,494 B1    3/2001  Williams
6,452,693 B1 *  9/2002  Isoda et al. ............... 358/1.16
6,553,440 B1 *  4/2003  Ikegaya ........................ 710/62
6,647,016 B1 * 11/2003  Isoda et al. ................. 370/412
6,654,380 B1 * 11/2003  Yumiba et al. ............. 370/412
6,701,386 B1 *  3/2004  Isoda et al. .................... 710/6
2001/0042141 A1 * 11/2001  Matsunaga ..................... 710/1

(Continued)

FOREIGN PATENT DOCUMENTS

EP    1 008 941 A2   6/2000
EP    1 014 650 A2   6/2000

(Continued)

OTHER PUBLICATIONS

Johansson, P. "Information Technology Serial Bus Protocol 2 (SBP-2)" XP-002308462, T10 Project 1155D, pp. 13-14, 37-44, 87, May 19, 1998.

*Primary Examiner*—Tanh Q. Nguyen
(74) *Attorney, Agent, or Firm*—McDermott Will & Emery LLP

(57) ABSTRACT

In order to reduce load placed on a CPU (central processing unit) in providing SBP-2 (serial bus protocol 2) initiator capability, provided are a sequence control circuit activated by the CPU for controlling a command issue sequence, a packet processing circuit for assembling operation request blocks (ORB) into a transmission packet and extracting a status from a received packet; buffer for storing a command ORB provided by the CPU; a buffer for storing a management ORB provided by the CPU; a buffer for storing a status received for an issued management ORB and providing the status to the CPU; and a buffer for command for storing a status received for an issued command ORB and providing the status to the CPU.

5 Claims, 29 Drawing Sheets

U.S. PATENT DOCUMENTS

| | | | |
|---|---|---|---|
| 2002/0059487 A1* | 5/2002 | Talati | 710/36 |
| 2002/0067697 A1* | 6/2002 | Ito et al. | 370/242 |
| 2003/0212850 A1* | 11/2003 | Nagasaka | 710/305 |

FOREIGN PATENT DOCUMENTS

| | | |
|---|---|---|
| JP | 59-020030 | 2/1984 |
| JP | 2000250846 | 9/2000 |

* cited by examiner

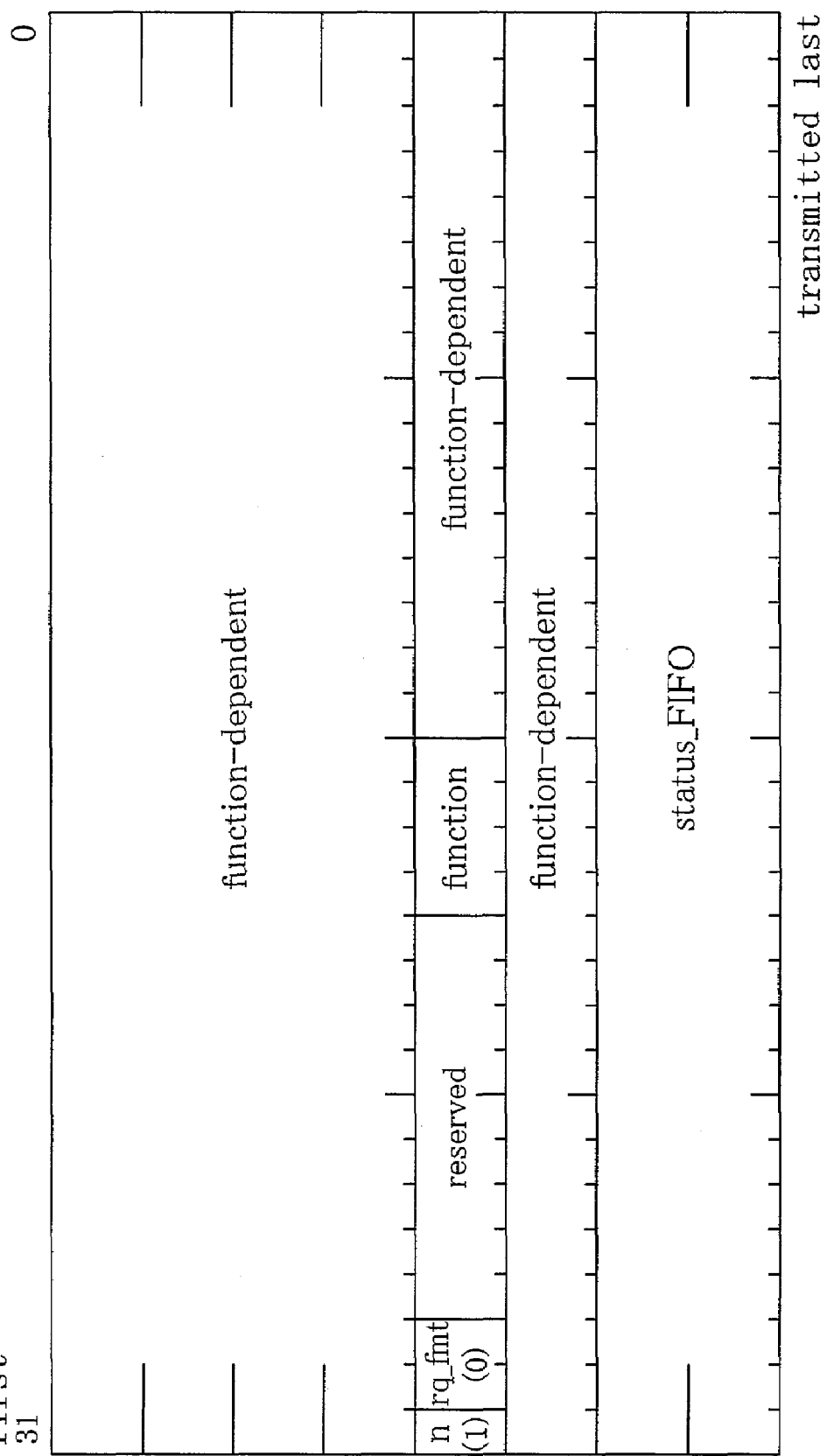

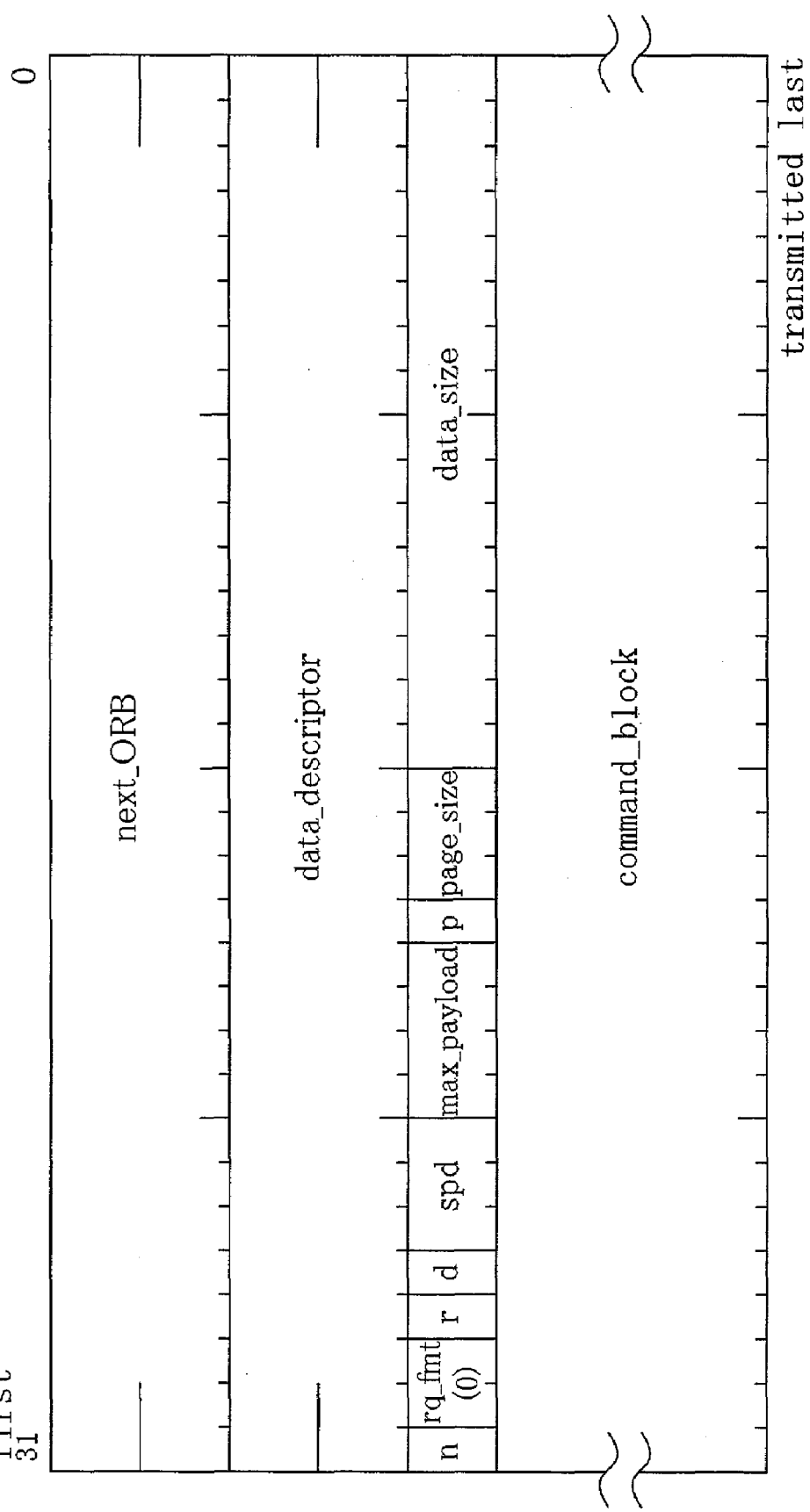

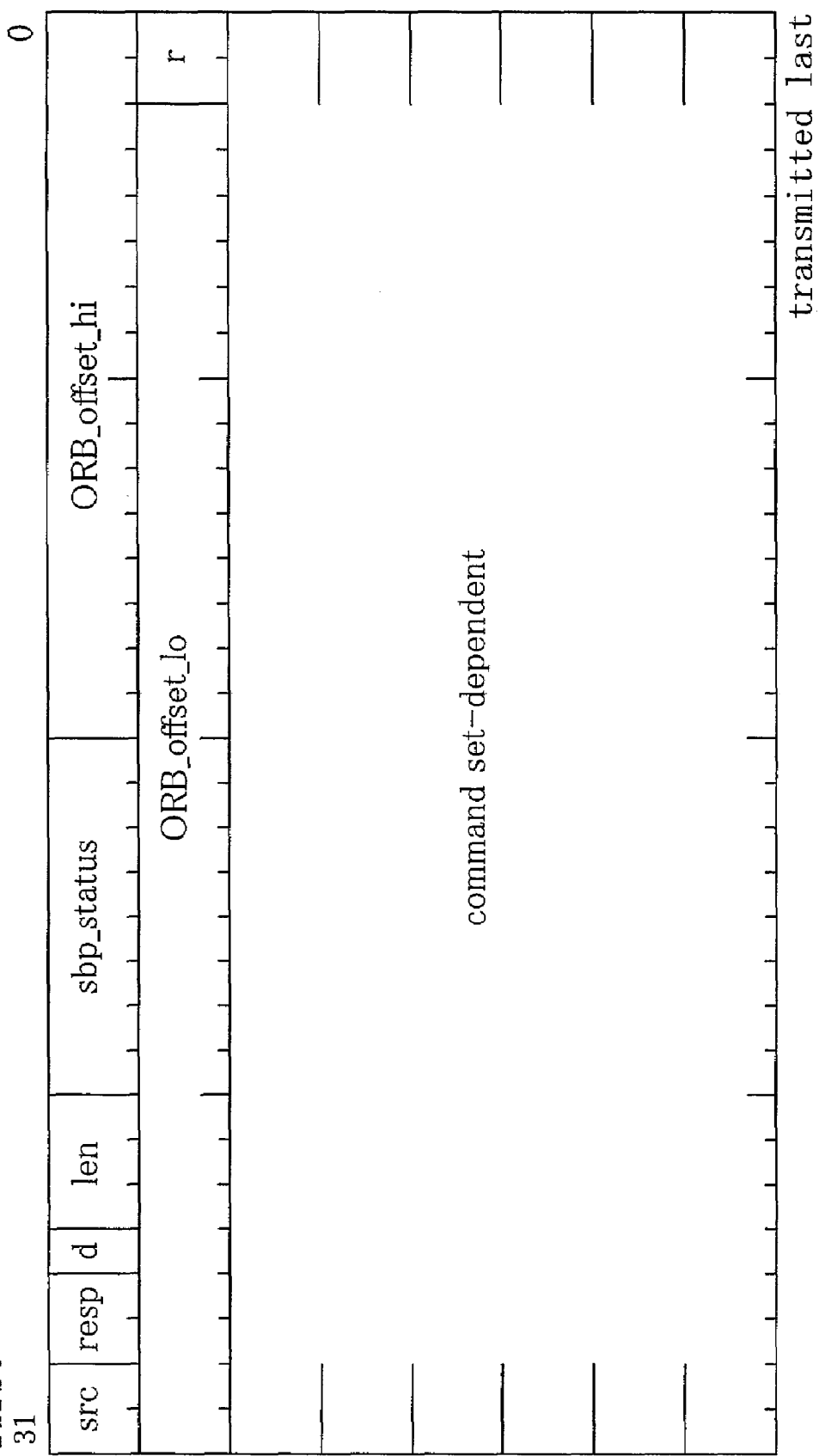

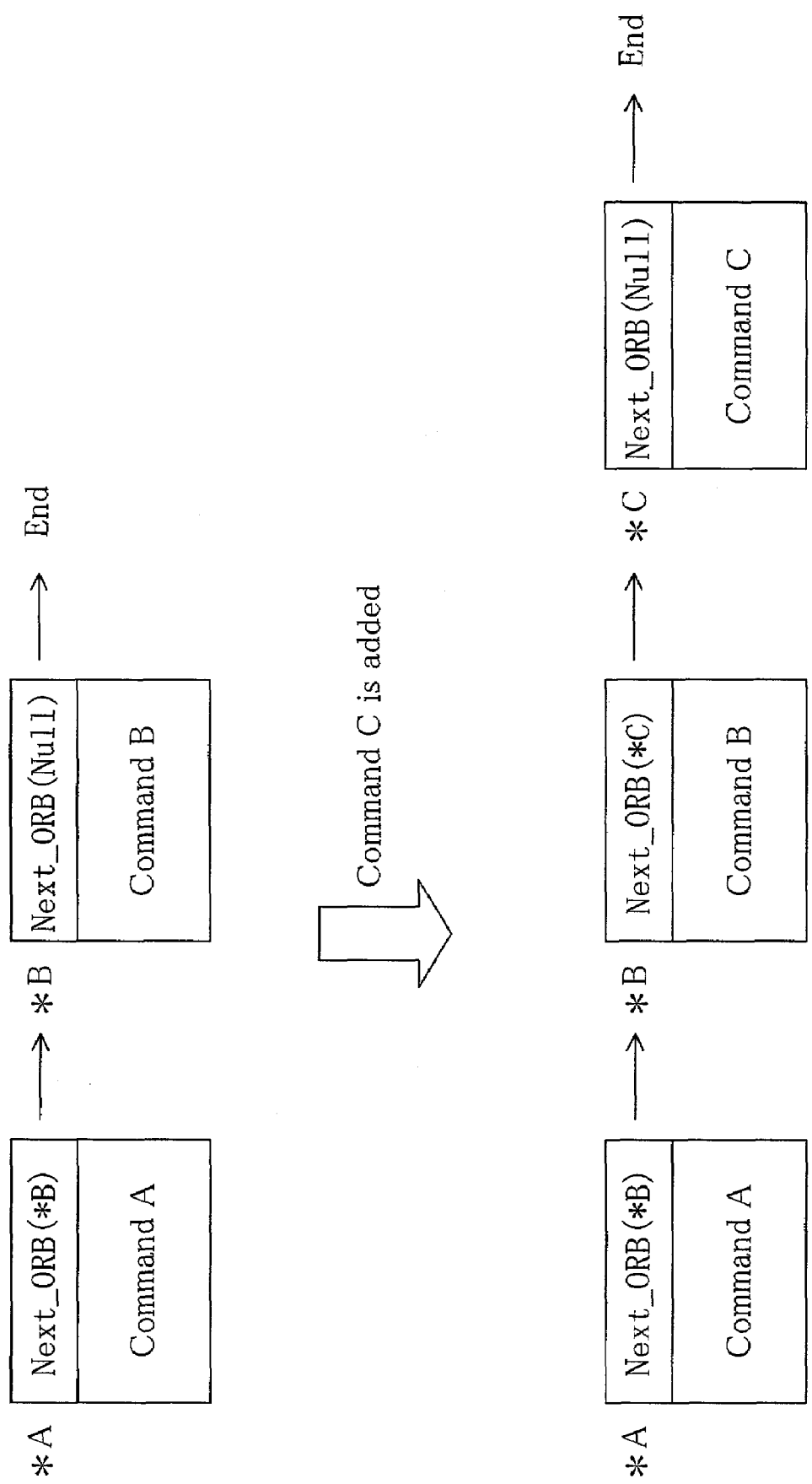

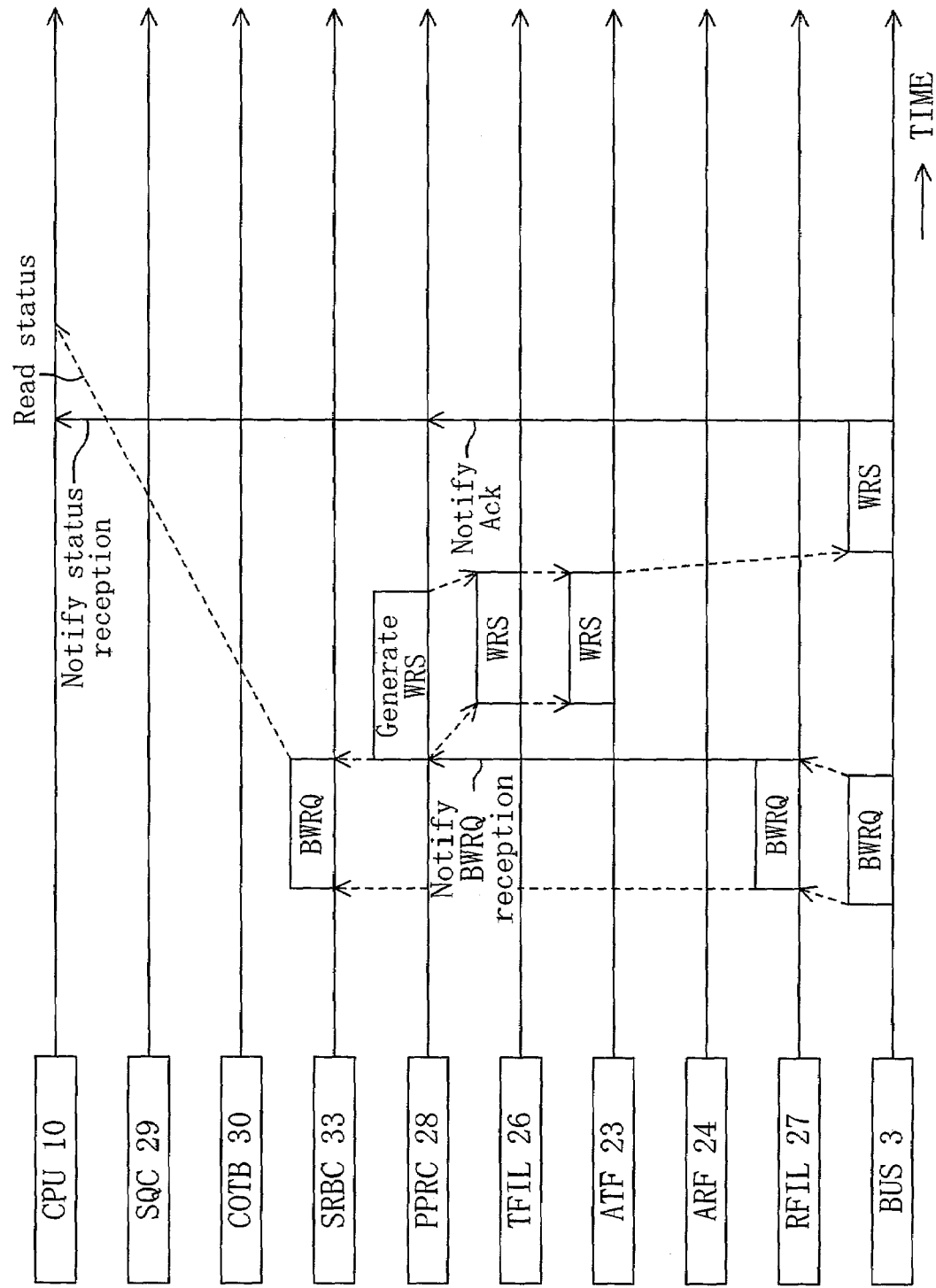

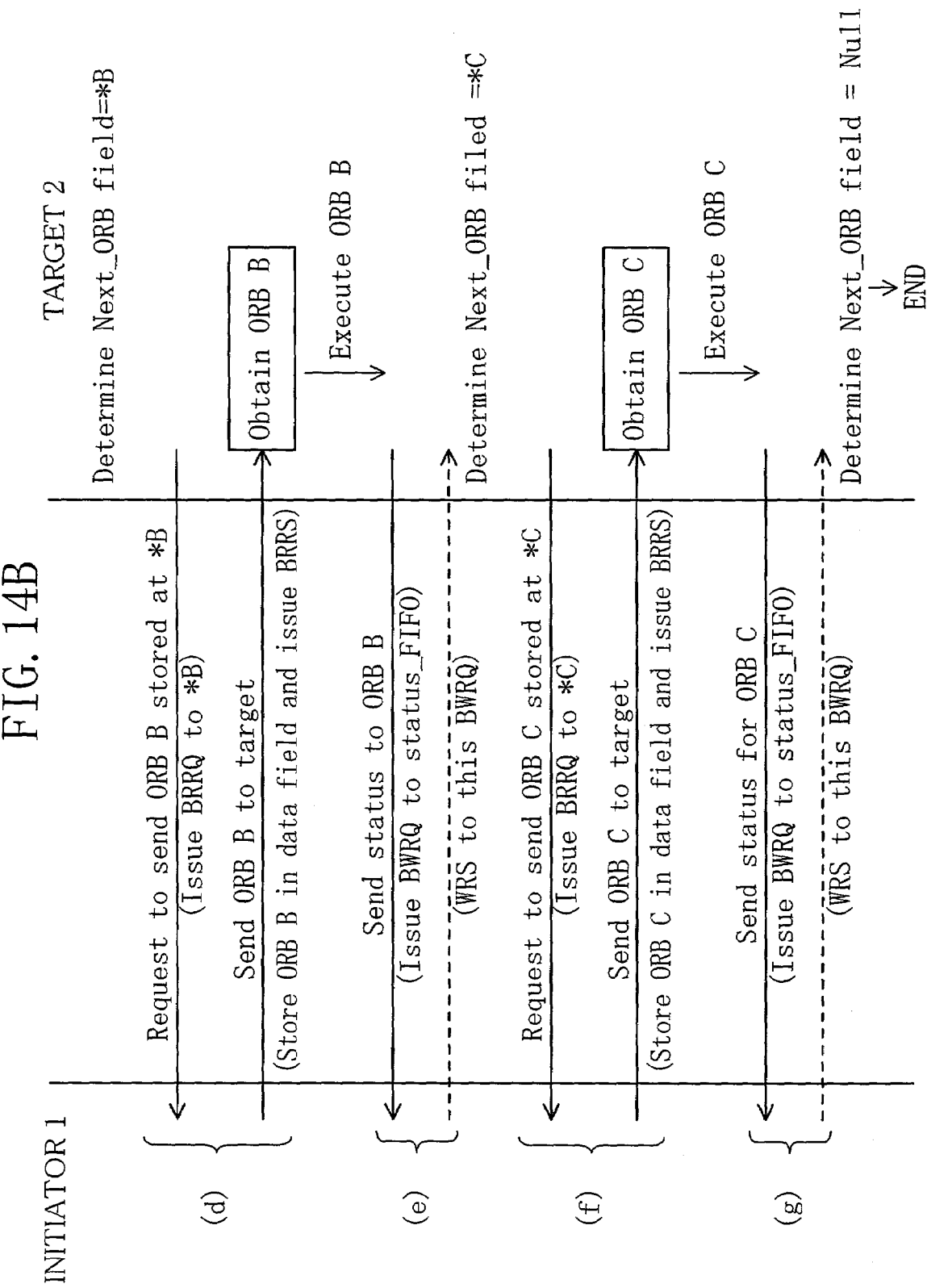

COMMAND ISSUING APPARATUS FOR HIGH-SPEED SERIAL INTERFACE

BACKGROUND OF THE INVENTION

The present invention relates to a command issuing apparatus for a high-speed serial interface.

In recent years, IEEE 1394 interfaces have received attention as high-speed serial interfaces for interconnecting audiovisual apparatuses and computers. The IEEE 1394 technology can be used not only for communications between computers through ATAPI (AT Attachment Packet Interface) and SCSI (Small Computer System Interface), which are conventional parallel interfaces, but also for communications between audiovisual apparatuses. This is because IEEE 1394 defines asynchronous communication and isochronous communication.

When computer data is stored in a magnetic disk such as a hard disk or an optical disk such as a DVD-RAM or computer data stored in such a disk is read by a host computer using the IEEE 1394 technology, a control command and data is typically transmitted using asynchronous communication. SBP-2 (Serial Bus Protocol 2), which is a protocol using asynchronous communication, has been generally used for communication between the host computer (initiator) and the hard disk or DVD-RAM (target).

With the commencement of digital broad casting services in Japan, the fusion of audiovisual apparatuses and computers has been accelerated and a hard disk and DVD-RAM have begun to be used as a recording medium for a set top box (STB). Audiovisual data is recorded on these disks in a format that can be handled as a computer file in order to facilitate the management and editing of the data. In such a case, it is required that an SBP-2 initiator capability be provided in the STB, which is an audiovisual apparatus.

Because the dominating apparatuses having the SBP-2 initiator capability have been computers, central processing units (CPUs) offering sufficient speed performance have controlled the transmission and reception of all packets, especially the generation of packets containing operation request blocks (ORBs), in accordance with a program. However, in terms of a cost/performance ratio it is difficult to include a CPU offering sufficient speed performance in an audiovisual apparatus.

In addition, when audiovisual data is recorded or images are reproduced or edited in a target apparatus (such as a hard disk drive or DVD-RAM drive) by an initiator apparatus (STB), the CPU cannot provide sufficient command execution speeds and therefore transmission performance of the target apparatus cannot be fully exploited. Furthermore, required transfer performance of the entire system cannot be achieved.

SUMMARY OF THE INVENTION

It is an object of the present invention to reduce load on a CPU when it issues a command in an apparatus providing high-speed serial interface initiator capability.

To achieve the object, the present invention provides a command issuing apparatus as an initiator in a high-speed serial interface that issues a command to a target by using a packet, comprising: a sequence control circuit activated by a central processing unit (CPU) for controlling a command issue sequence; a packet processing circuit for assembling operation request blocks (ORB) to be issued into a transmission packet and extracting a status from a received packet; a command ORB transmission buffer for storing a command ORB provided by the CPU; a management ORB transmission buffer for storing a management ORB provided by the CPU; a status reception buffer for management for storing a status received for an issued management ORB and providing the status to the CPU; and a status reception buffer for command for storing a status received for an issued command ORB and providing the status to the CPU.

According to the present invention, once the CPU stores a command ORB or a management ORB in its transfer buffer and activates the sequence control circuit, no additional load is placed on the CPU until it receives a status for the ORB issued.

According to the present invention, an initiator capability with high response performance can be provided in the command issuing apparatus by using non-programmed control.

BRIEF DESCRIPTION OF THE DRAWINGS

FIG. 2 shows a data format of a management ORB in SBP-2.

FIG. 3 shows a data format of a command ORB in SBP-2.

FIG. 4 shows a data format of a status in SBP-2.

FIG. 5 shows a diagram for explaining links between command ORBs in SBP-2.

FIG. 13B shows a timing chart continued from FIG. 13A.

FIG. 14B shows a sequence continued from FIG. 14A.

DETAILED DESCRIPTION OF THE INVENTION

Embodiments of the present invention will be described below in detail with reference to the accompanying drawings. However, the following description does not limit the technical scope of the present invention.

FIGS. 1A through 1E show structures of some of the asynchronous packets defined in IEEE 1394. IEEE 1394 defines request packets for requesting operations and response packets for returning the results of the operation requested with the request packets. When one of these packets is received, an acknowledge (ACK) packet indicating the state of the reception of the packet is returned to the requesting device. The ACK packet indicates a state such as "ack_complete", which indicates the completion of an operation, "ack_pending", which indicates that a request has been received and a requested operation is being processed, and "ack_busy", which indicates a retransmission request (ack_busy). A request packet and a response packet are usually used in pairs.

Figure 1A:
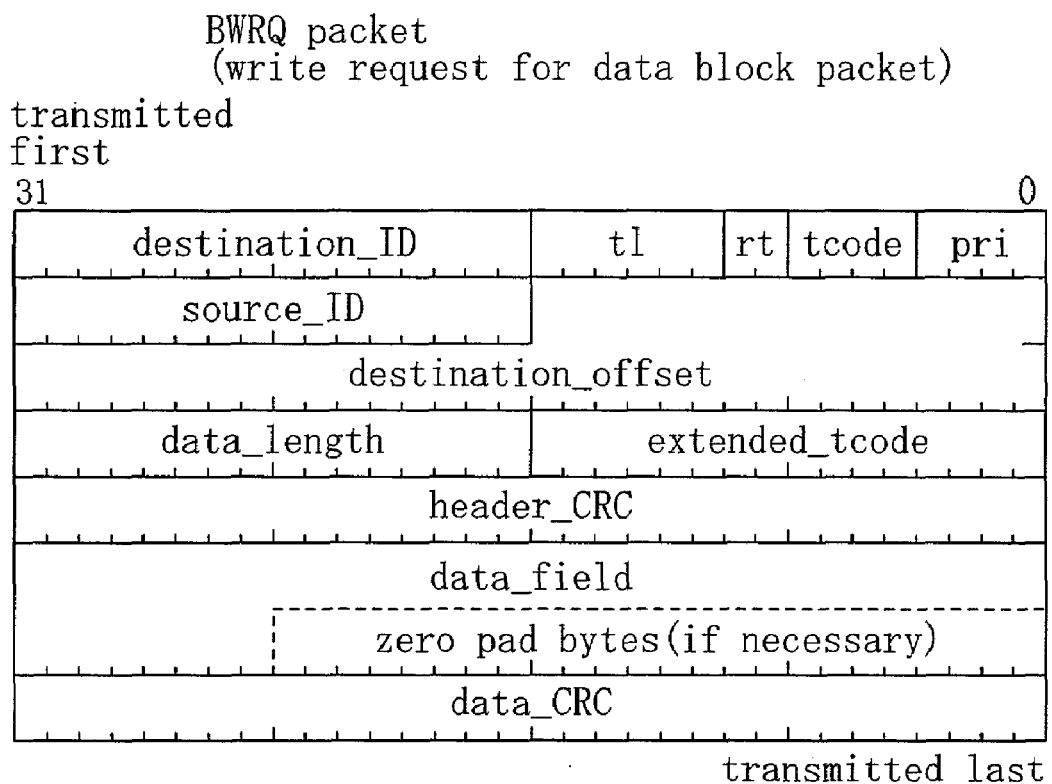
FIG. 1A shows a structure of a BWRQ packet on an IEEE 1394 bus.
Figure 1B:
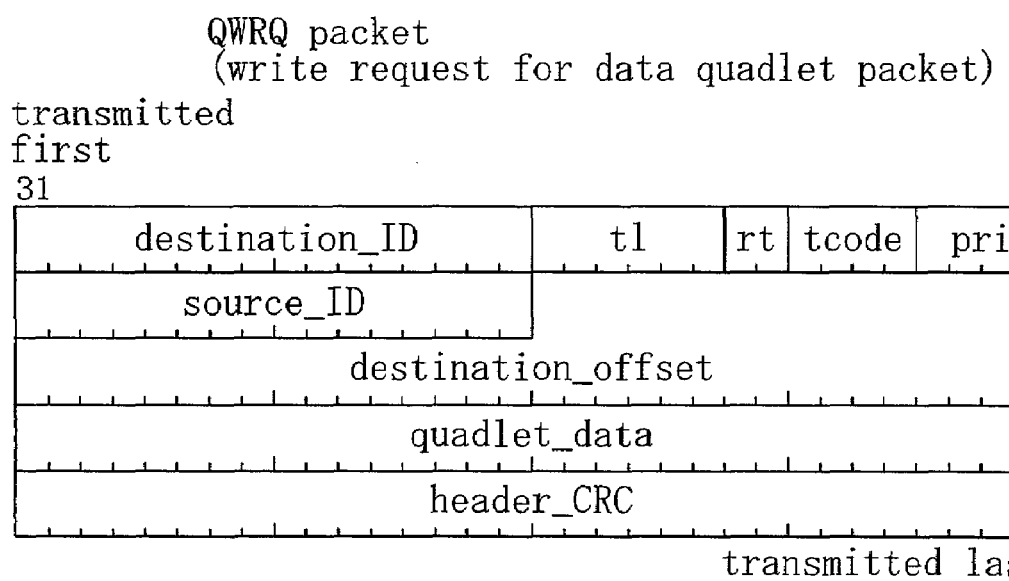
FIG. 1B shows a structure of a QWRQ packet on the IEEE 1394 bus.
Figure 1C:
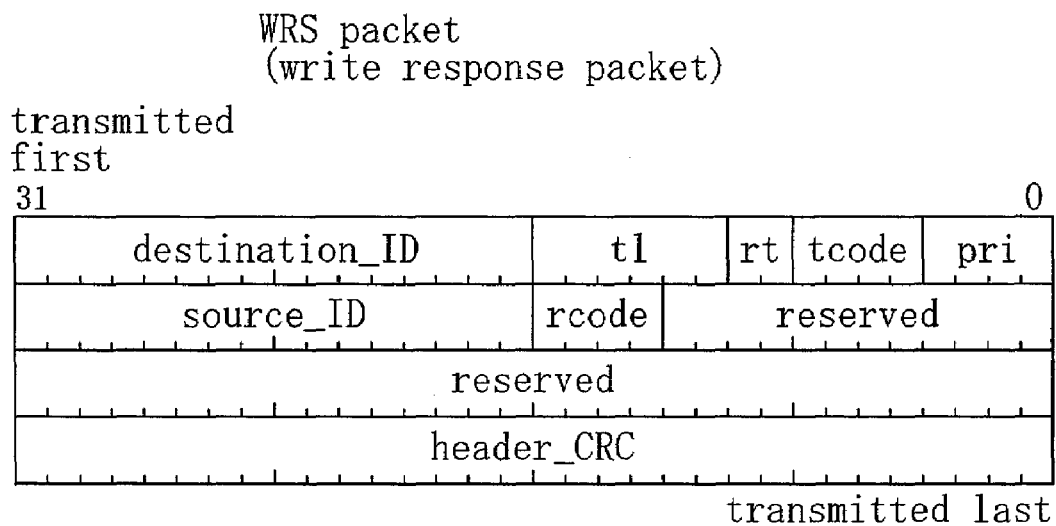
FIG. 1C shows a structure of a WRS packet on the IEEE 1394 bus.
Figure 1D:
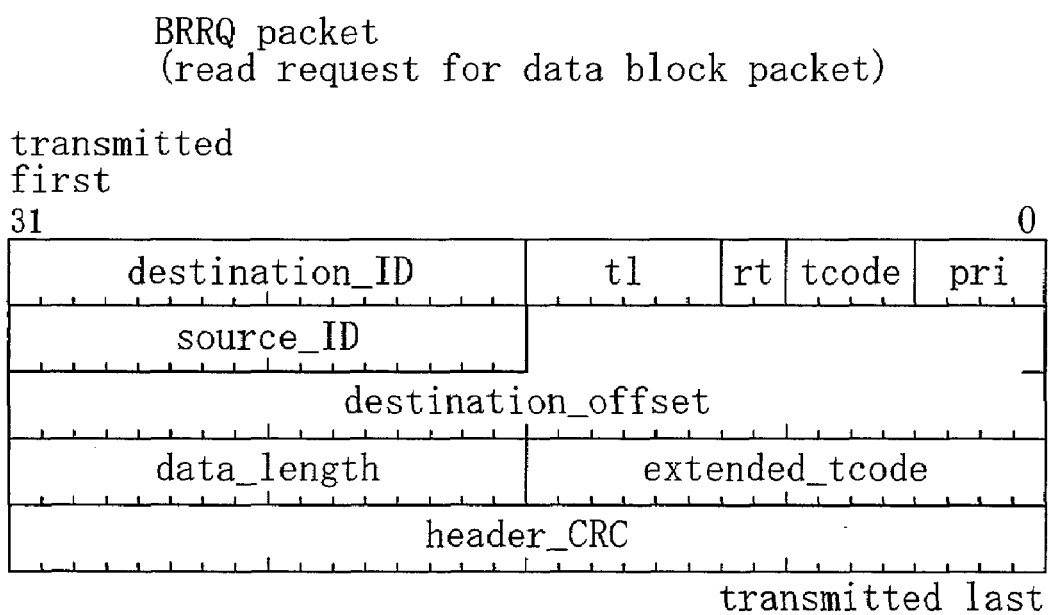
FIG. 1D shows a structure of a BRRQ packet on the IEEE 1394 bus.
Figure 1E:
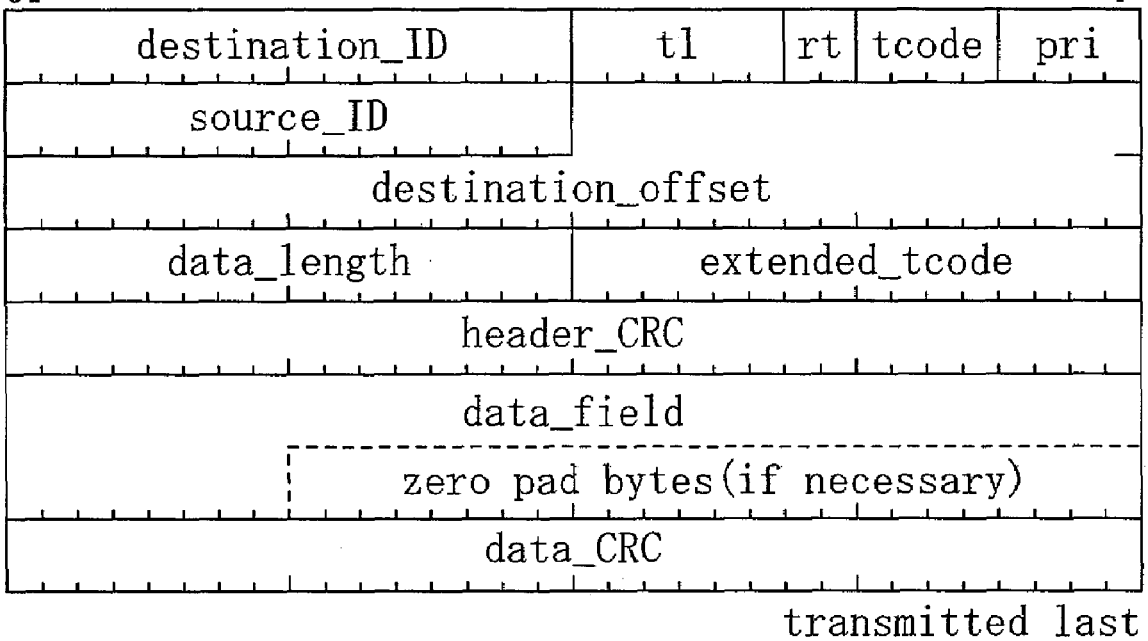
FIG. 1E shows a structure of a BRRS packet on the IEEE 1394 bus.

FIGS. 1A, 1B, and 1D show request packets, a BWRQ packet (write request for data block packet), QWRQ packet (write request for data quadlet packet), and BRRQ packet (read request for data block packet), respectively. A WRS packet (write response packet) shown in FIG. 1C is defined for the write request (BWRQ and QWRQ) packets. A BRRS packet (read response for data block packet) shown in FIG. 1E is defined for the BRRQ packet. Each of these request and response packets contains a transaction code (tcode) identifying the type of packet and a transaction label (tl), which is tag information specific to a transaction. The response packets contain a response code (rcode) indicating a state of response. Thus, the type of transaction can be identified by tcode and a pair of request packet and response packet can be identified by tl. See the IEEE 1394-1995 standard for further information.

FIGS. 2, 3, and 4 show data formats specified in SBP-2. An initiator generates an ORB in its system memory. SBP-2 defines management commands for managing connections between the initiator and a target and command execution. These commands are included in a management ORB shown in FIG. 2 to handle them. Commands such as a READ command and WRITE command are included in a command ORB shown in FIG. 3 to handle them. A command is contained in a command_block field. FIG. 4 shows the data format of a status. Registers such as a MANAGEMENT_AGENT register and CommandAgent register are defined in a CSR (control and status register) space in the target. The CommandAgent register consists of AGENT_STATE, AGENT_RESET, ORB_POINTER, and DOORBELL registers.

FIG. 5 shows links between command ORBs. The next_ORB field, shown in FIG. 3, of a command ORB that is linked to no command ORB is set to Null. In particular, "1" in the start bit of next_ORB field indicates Null. On the other hand, if command ORB A is linked to command B, the next_ORB field of command A issued before the command ORB contains the address of command B, as shown in the upper section of FIG. 5. This allows the target to obtain a command ORB at an address indicated by the next_ORB field until the next_ORB field of an ORB command obtained indicates Null.

Figure 6:
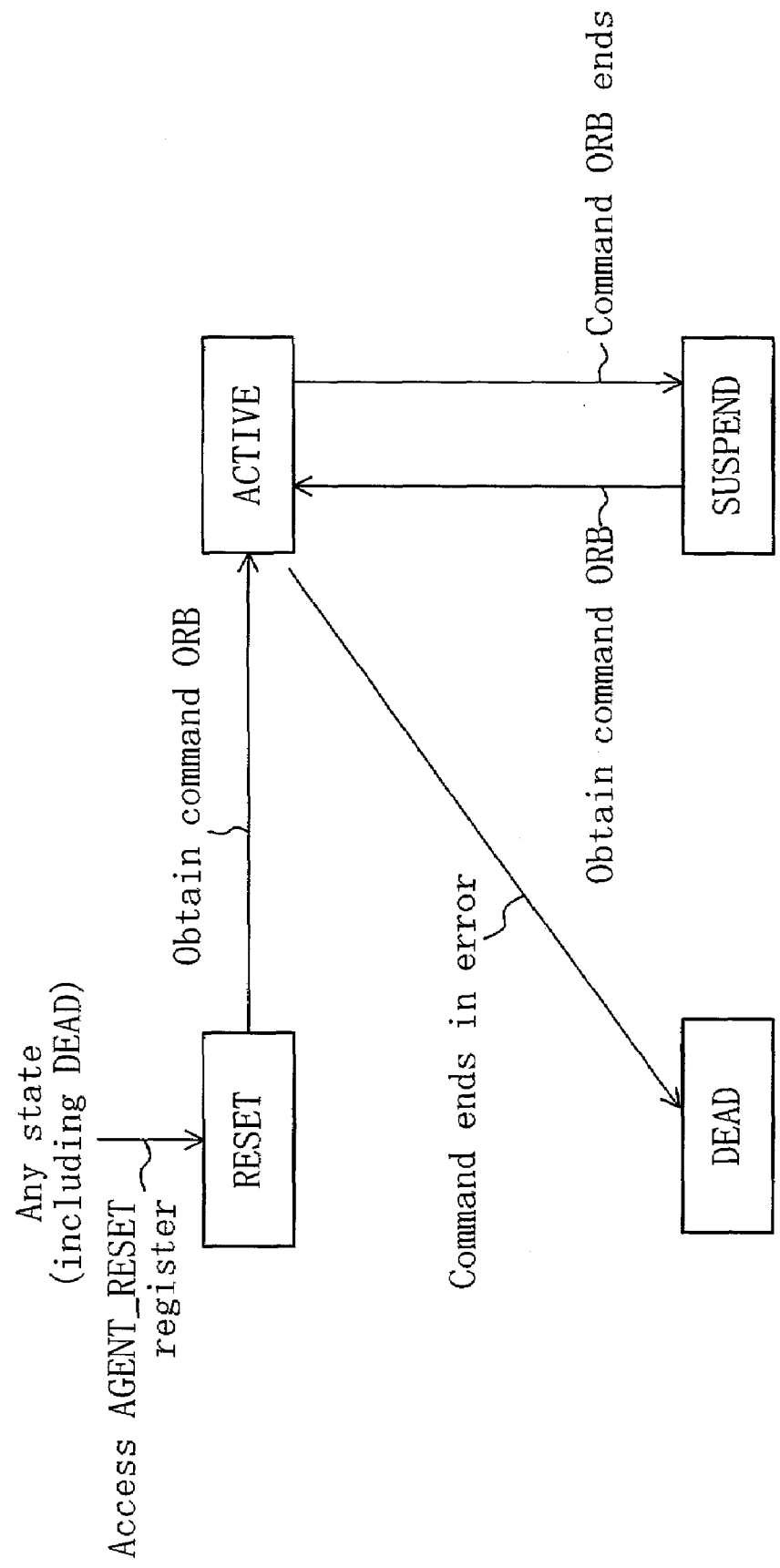
FIG. 6 shows a state transition diagram of a target in SBP-2.

State management performed by a target in SBP-2 will be described below with reference to FIG. 6. As shown in FIG. 6, the target is managed with RESET, ACTIVE, SUSPEND, and DEAD states. These four states are indicated by an AGENT_STATE register, which is one of CommandAgent registers. The target is in the RESET state during power-up. When the ORB-POINTER register in the target is accessed and a command ORB is obtained, the target enters the ACTIVE state. After the completion of the command ORB, it returns a status and makes transition to the SUSPEND state. Subsequently, when the ORB_POINTER register or DOORBELL register is accessed and a command ORB is obtained, the target makes transition to the ACTIVE state and, after returning a status, enters the SUSPEND state. This sequence is repeated. If a command ORB abnormally ends or a transaction error occurs in the execution sequence of the command ORB, the target enters the DEAD state. Because the target in the DEAD state cannot continue to obtain command ORBs, the target causes the initiator to access the AGENT_RESET register to return to the RESET state.

Figure 7:
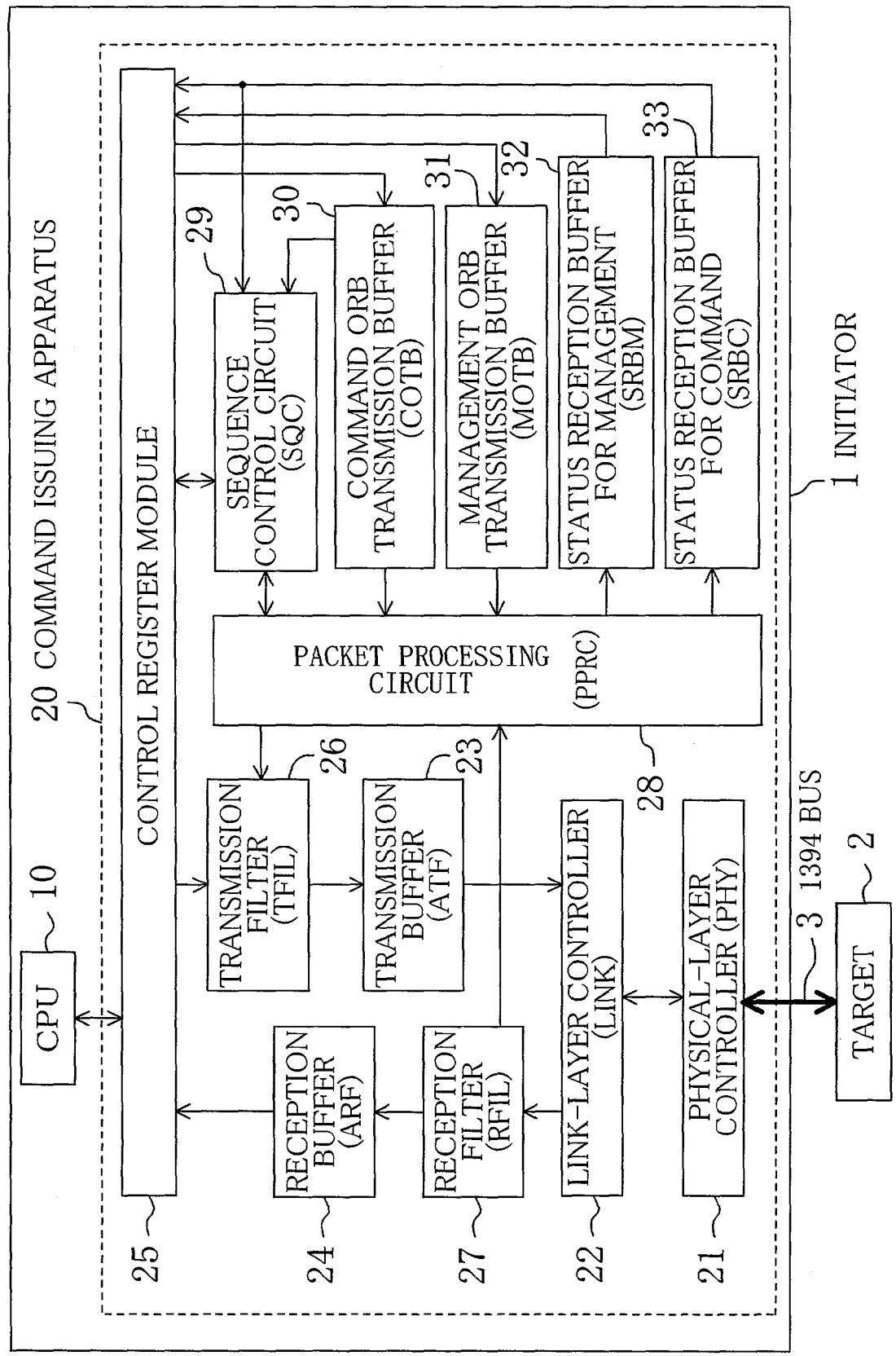
FIG. 7 shows a block diagram of a data transmission system in which an SBP-2 command issuing apparatus according to the present invention is provided.

FIG. 7 shows a block diagram of a data transmission system in which a SBP-2 command issuing apparatus according to the present invention is provided. In the system shown in FIG. 7, an initiator 1 is connected to a target 2 over an IEEE 1394 bus 3. The initiator 1 may be an STB and the target 2 may be a hard disk drive or optical disk drive, for example. The initiator 1 includes a CPU 10 and the command issuing apparatus 20. The command issuing apparatus 20 comprises a physical-layer controller (PHY) 21, a link-layer controller (LINK) 22, an asynchronous transmission FIFO buffer (ATF) 23, an asynchronous reception FIFO buffer (ARF) 24, a control register module 25, a transmission filter (TFIL) 26, a reception filter (RFIL) 27, a packet processing circuit (PPRC) 28, a sequence control circuit (SQC) 29, a command ORB transmission buffer (COTB) 30, a management ORB transmission buffer (MOTB) 31, a status reception buffer for management (SRBM) 32, and a status reception buffer for command (SRBC) 33.

The physical-layer controller 21 has the capabilities of initializing the bus 3, encoding/decoding data, performing arbitration, and providing/detecting a bias voltage. The link-layer controller 22 has the capabilities of sending and receiving packets and generating/detecting an error correcting code. The asynchronous transmission FIFO buffer 23 stores a packet to be transmitted and the asynchronous reception FIFO buffer 24 stores a received packet directed to the CPU 10. The control register module 25 is a group of registers used in various control operations performed by the CPU 10 in transmitting or receiving a packet, performing initial setting for issuing a command, storing an ORB, and reading a status.

The transmission filter 26 receives a packet transmission request from the packet processing circuit 28 or a packet transmission request from the CPU 10 and, if the transmission buffer 23 is empty, writes the requested packet into the transmission buffer 23. The transmission filter 26 has an arbitration function for giving priority to one of packet transmission requests provided from the packet processing circuit 28 and a packet transmission request from the CPU 10 at the same time. It also has the function of prohibiting a packet from being written into the transmission buffer 23 if it is not empty.

The reception filter 27 discriminates between a packet directed to the packet processing circuit 28 and a packet directed to the CPU 10. In particular, the reception filter 27 determines a packet as one directed to the packet processing circuit 28 based on information provided from the packet processing circuit 28 when a command is issued, that is, tcode and destination offset (packet destination address) for a request packet or tcode and tl for a response packet, and passes the received packet to the packet processing circuit 28. The reception filter 27 determines other received packets as ones directed to the CPU 10 and stores them in the reception buffer 24.

The packet processing circuit 28 generates packets and manages transactions related to a command issue sequence and the reception of a status. Details of its operation will be described later.

The sequence control circuit 29 controls a command issue sequence in cooperation with the command ORB transmission buffer 30 and management ORB transmission buffer 31. The sequence control circuit 29 receives from the CPU 10 or other blocks a request for accessing each of a MANAGEMENT_AGENT register and a CommandAgent register based on the address of each of the MANAGEMENT_AGENT register and CommandAgent register of the target 2 and the destination ID of the target 2 received from the CPU 10 through a control register module 25, generates a request packet, and provides it to the packet processing circuit 28. The sequence control circuit 29 also receives notification of the reception of a response packet responding to that request packet from the packet processing circuit 28 to manage the command issue sequence.

The command ORB transmission buffer 30 stores a command ORB provided by the CPU 10 through the control register module 25. In addition, the command ORB transmission buffer 30 has the function of automatically managing the addresses of command ORBs. In particular, when a command ORB is stored by the CPU 10, the command ORB transmission buffer 30 automatically decides the address of the command ORB and communicates the address to the sequence control circuit 29. The sequence control circuit 29 will use a BWRQ packet to write the address of the command ORB in the ORB_POINTER register of the target 2 when issuing the command ORB. The address of the command ORB is also communicated from the sequence control circuit 29 to the reception filter 27 through the packet processing circuit 28. If the destination_offset of the BWRQ packet received from the target 2 matches the address of the command ORB, the BWRQ packet is provided to the packet processing circuit 28 and the packet processing circuit 28 generates a BRRS packet containing an ORB read from the command ORB transmission buffer 30 and provides it to the transmission filter 26.

The command ORB transmission buffer 30 can store a plurality of ORBs. It has the capability of automatically performing ORB linking if an unissued command is in the command ORB transmission buffer 30 when a command ORB is provided from the CPU 10. As shown in the bottom section of FIG. 5, the command ORB transmission buffer 30 automatically assigns an address to the additionally buffered command ORB and changes the next_ORB field of the command ORB previously buffered to the address of the additionally buffered command ORB. The command ORB transmission buffer 30 also submits a request to the sequence control circuit 29 for access to the DOORBELL register of the target 2.

The management ORB transmission buffer 31 stores a management ORB provided by the CPU 10 through the control register module 25. In addition, the management ORB transmission buffer 31 has the capability of automatically managing addresses of management ORBs. In particular, when a management ORB is buffered by the CPU 10, the management ORB transmission buffer 31 automatically decides the address of the management ORB and communicates the address to the sequence control circuit 29. The sequence control circuit 29 will use a BWRQ packet to write the address of the ORB into the MANAGEMENT_AGENT register of the target 2 when issuing the management ORB. The address of the management ORB is also communicated from the sequence control circuit 29 to the reception filter 27 through the packet processing circuit 28. If the destination_offset of a BWRQ packet received from the target 2 matches the address of the management ORB, the BWRQ packet is provided to the packet processing circuit 28. The packet processing circuit 28 generates a BRRS packet containing an ORB read from the management ORB transmission buffer 31 and provides it to the transmission filter 26.

The status reception buffer for management 32 stores a status received for an issued management ORB and communicates it to the CPU 10. When the reception filter 27 receives from the target 2 a BWRQ packet having a destination_offset that matches the address in STATUS_FIFO provided from the CPU 10 to the reception register 27 through the control register module 25 before the issue of the management ORB, the reception filter 27 provides the BWRQ packet to the packet processing circuit 28. If the address of the management ORB communicated from the management ORB transmission buffer 31 matches the ORB_offset_hi/ORB_offset_lo (see FIG. 4) of the received status, the packet processing circuit 28 provides the status to the status reception buffer for management 32.

The status reception buffer for command 33 stores a status received for an issued command ORB and communicates it to the CPU 10. When the reception filter receives a BWRQ packet having a destination_offset that matches the address in STATUS_FIFO communicated from the CPU 10 to the reception filter 27 through the control register module 25 from the target 2 before the issue of the command ORB, the reception filter 27 provides the BWRQ packet to the packet processing circuit 28. If the address of the management ORB communicated from the management ORB transmission buffer 31 does not matches the ORB_offset_hi/ORB_offset_lo of the received status, the packet processing circuit 28 provides the status to the status reception buffer for command 33. The status reception buffer for command 33 can store a plurality of statuses. The status reception buffer for command 33 also has the function of submitting a request to the sequence control circuit 29 for access to the AGENT_RESET register of the target 2, if it detects that the status it received is an error (bit d set in the status shown in FIG. 4 indicates that the relevant command ORB is in error).

Five exemplary operations of the command issuing apparatus 20 shown in FIG. 1 will be described below.

(First Exemplary Operation)

Figure 8:
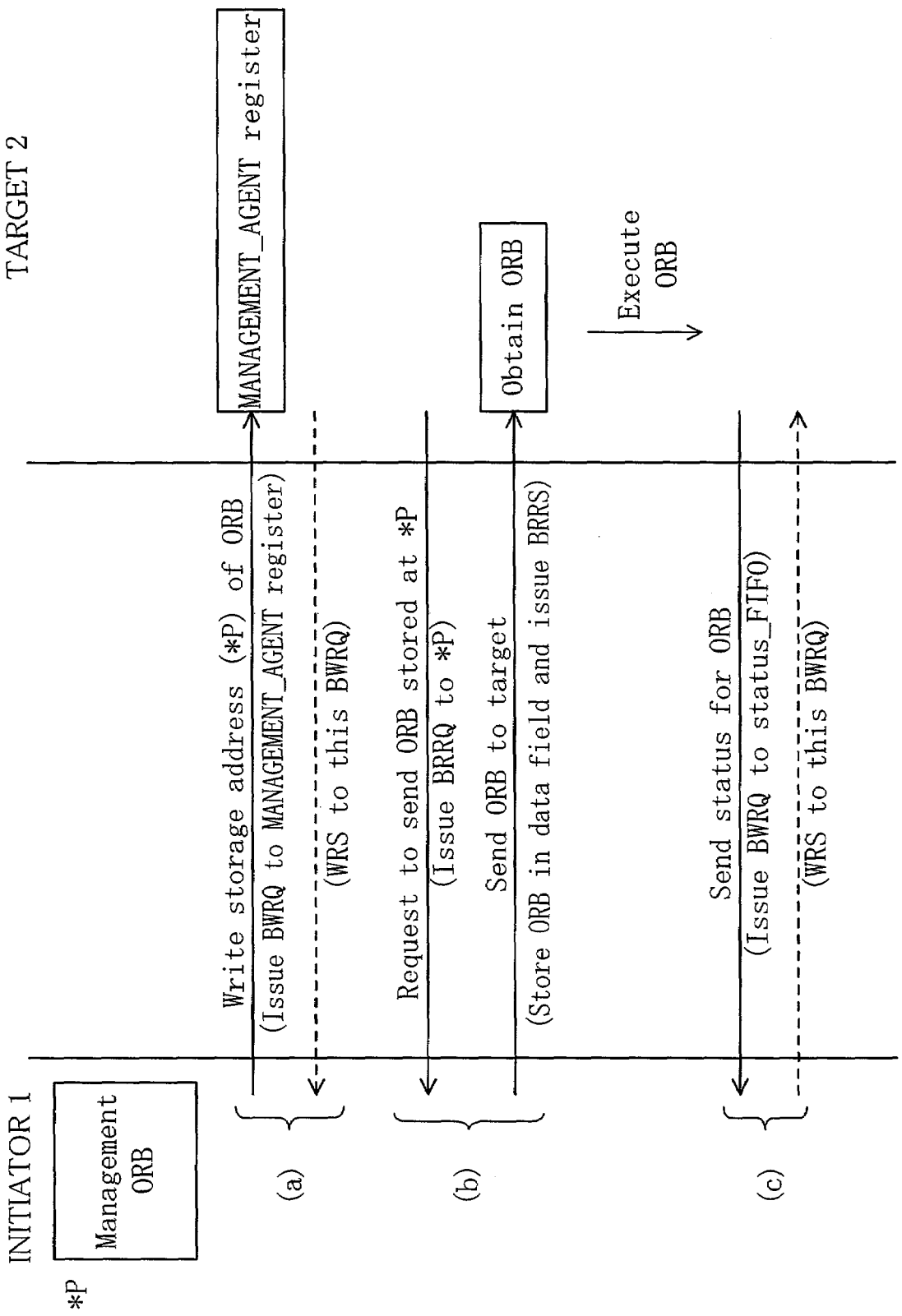
FIG. 8 shows a sequence for issuing a management ORB by the command issuing apparatus shown in FIG. 7.
Figure 9A:
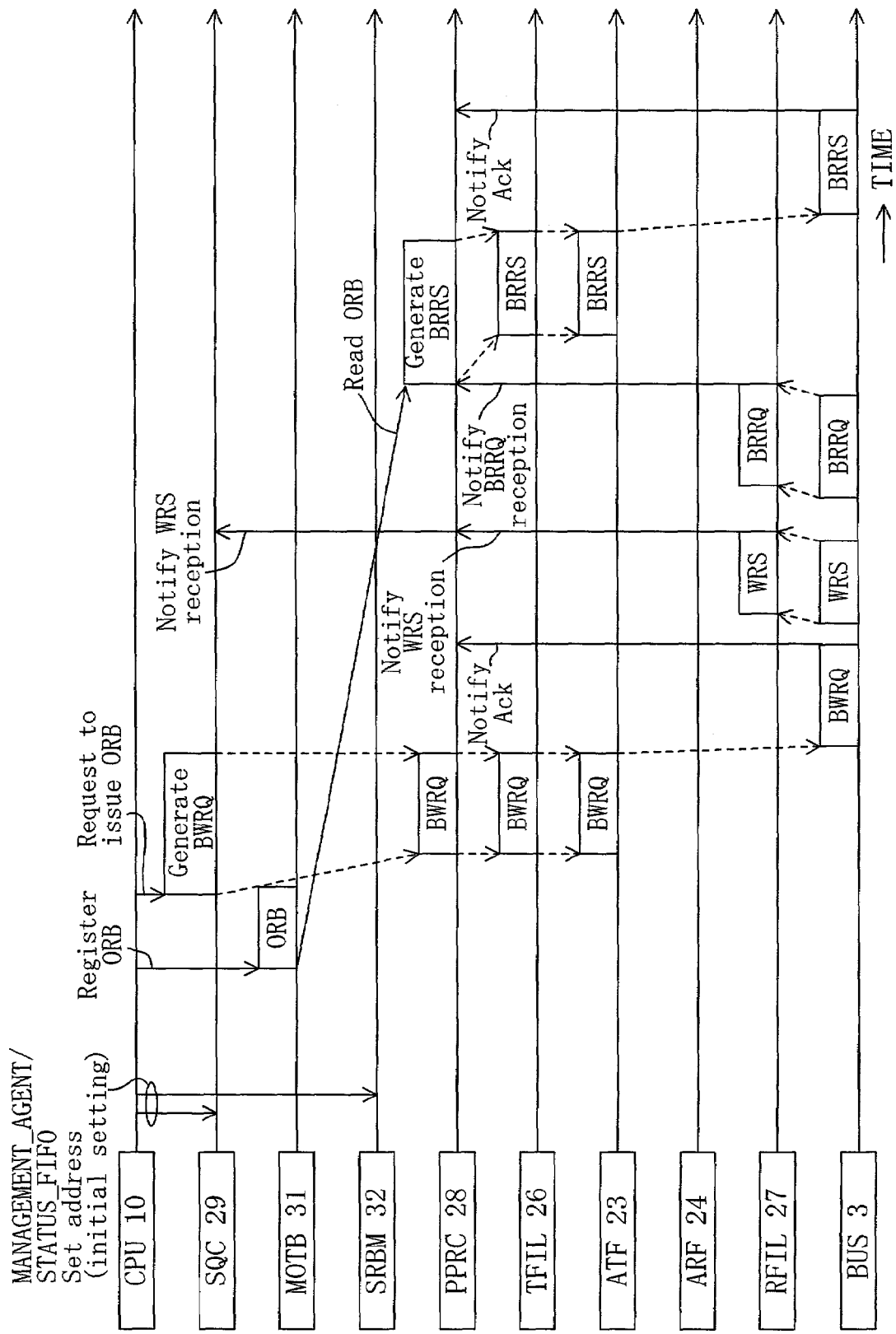
FIG. 9A shows a timing chart indicating operations of components shown in FIG. 7 when the management ORB is issued.
Figure 9B:
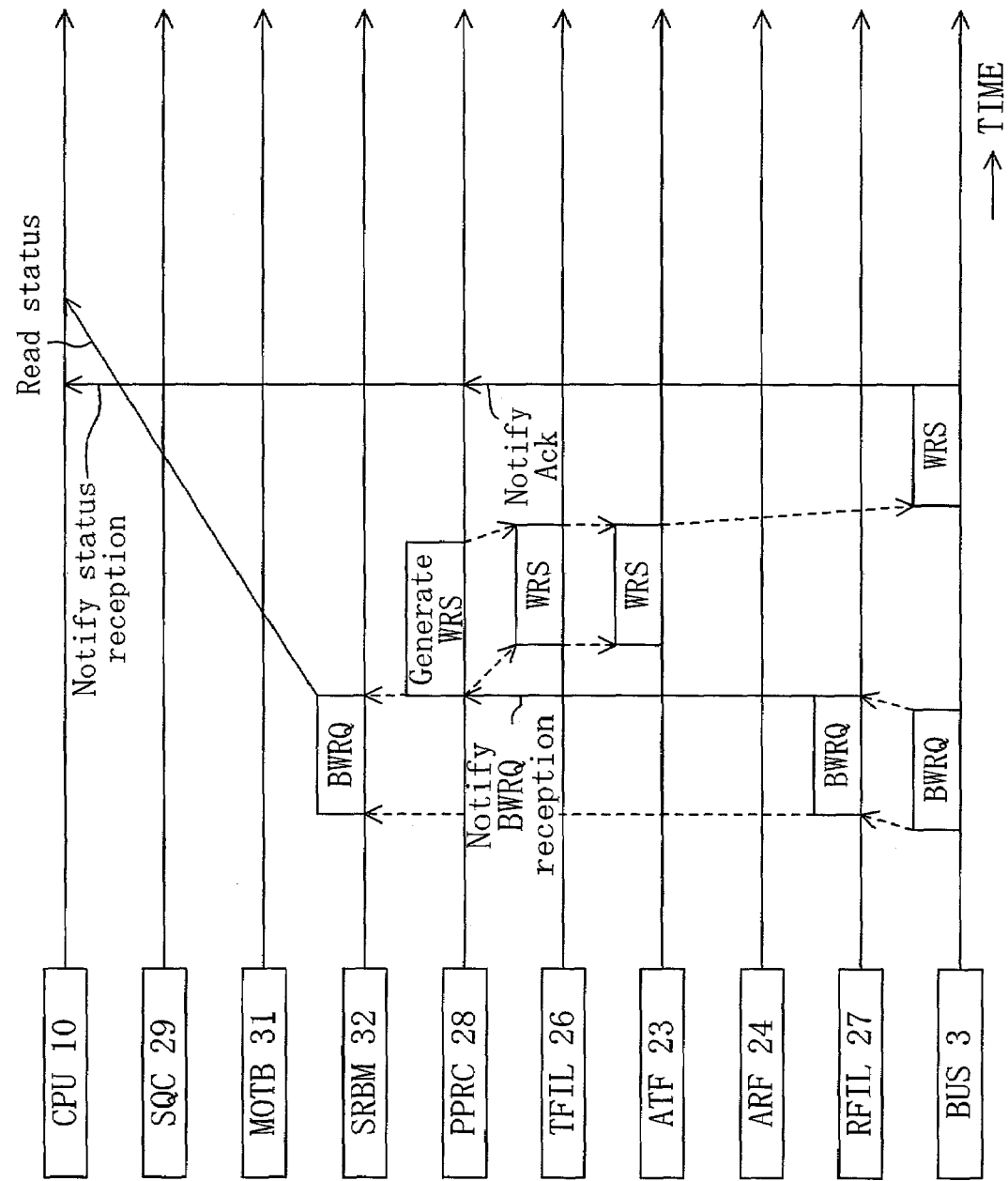
FIG. 9B shows a timing chart continued from FIG. 9A.

An operation of the command issuing apparatus 20 that is performed when a management ORB is issued will be describe with reference to FIGS. 8, 9A, and 9B. While an initiator 1 should obtain the address of a MANAGEMENT_AGENT register from configuration ROM of a target 2 before it issues the management ORB, the description of that operation will be omitted here.

(1) The CPU 10 sets the address of the MANAGEMENT_AGENT register obtained form the target 2 and the node ID of the target 2 in the sequence control circuit 29 and sets the address of a status reception buffer (STATUS_FIFO) in the status reception buffer for management 32 as initial settings.

(2) The CPU 10 generates a management ORB to be issued and stores it in the management ORB transmission buffer 31. The management ORB transmission buffer 31 decides the address (*P in FIG. 8) of the management ORB and communicates it to the sequence control circuit 29. It also communicates the address to the packet communication circuit 28 and reception filter 27.

(3) The CPU 10 requests the sequence control circuit 29 to issue the management ORB (phase "a" in FIG. 8 starts).

(4) The sequence control circuit 29 generates a BWRQ packet shown in FIG. 1A in which the node ID of the target 2 provided from the CPU 10 is set in destination_ID, the address of the MANAGEMENT_AGENT register is set in destination_offset, the address (*P) of the management ORB provided from the management ORB transmission buffer 31 is set in data_field, and tcode is set to "1" (indicating that this is a BWRQ packet), and data_length is set to "8". Then the sequence control circuit 29 provides it to the packet processing circuit 28.

(5) The packet processing circuit 28 sets a given value in tl in the BWRQ packet and sends out it onto the 1394 bus 3 through the transmission filter 26, transmission buffer 23, link-layer controller 22, and physical-layer controller 21. The packet processing circuit 28 communicates tcode and tl to the reception filter 27.

(6) The target 2 receives the BWRQ packet and returns a WRS packet.

(7) When the reception filter 27 determines that tcode of the received WRS packet is WRS and tl matches one provided from the packet processing circuit 28, the reception filter 27 notifies the packet processing circuit 28 and sequence control circuit 29 of the reception of the WRS packet and discards the WRS packet itself (phase "a" in FIG. 8 ends).

(8) Then, the target 2 sends a BRRQ packet to the address (*P) of the management ORB in order to obtain the management ORB. If the reception filter 27 determines that destination_offset of the received BRRQ packet matches the address (*P) of the management ORB communicated from the packet processing circuit 28, then it notifies the packet processing circuit 28 of the reception of the BRRQ packet, provides tl to it, and discards the BRRQ packet itself (phase "b" in FIG. 8 starts).

(9) The packet processing circuit 28 places the management ORB read from the management ORB transmission buffer 31 in data_field to generate a BRRS packet. Then, the packet processing circuit 28 changes tl of the BRRS packet to tl received from the reception filter 27 and sends out it onto the 1394 bus 3 through the transmission filter 26, transmission buffer 23, link-layer controller 22, and physical-layer controller 21.

(10) The target 2 receives the BRRS packet to obtain the management ORB and executes it (phase "b" in FIG. 8 ends).

(11) After the completion of the ORB, the target 2 generates a status shown in FIG. 4, places it in data_field in a BWRQ packet, and sends it to the initiator 1 (phase c in FIG. 8 starts).

(12) If the reception filter 27 determines that destination_offset in the BWRQ packet containing the received status matches the address in STATUS_FIFO set in the CPU 10, it notifies the packet processing circuit 28 of the reception of the BWRQ packet and provides the BWRQ packet to the packet processing circuit 28.

(13) The packet processing circuit 28 references ORB_offset_hi and ORB_offset_lo (see FIG. 4) in the status contained in data_field in the BWRQ packet and, if they matches the address (*P) of the management ORB received from the management ORB transmission buffer 31, stores the status in the status reception buffer for management 32. At the same time, it generates a WRS packet for the BWRQ packet and sends out it onto the 1394 bus 3 through the transmission filter 26, transmission buffer 23, link-layer controller 22, and physical-layer controller 21.

(14) When the packet processing circuit 28 determines that information in an ACK packet for the transmitted WRS packet indicates a normal end, it notifies the CPU 10 of the reception of the status for the management ORB (phase "c" in FIG. 8 ends).

(15) The CPU 10 reads the status from the status reception buffer for management 32.

As described above, the command issuing apparatus 20 can eliminate load which would be placed on the CPU 10 until the CPU 10 receives the notification of the reception of the status and reads the status once the CPU 10 performs the initial setting, generates and registers a management ORB, and requests the issue of the management ORB.

(Second Exemplary Operation)

An operation of the command issuing apparatus 20 when issuing a command ORB will be described below with reference to FIGS. 10, 11A, and 11B. While an initiator 1 should obtain the address of a CommandAgent register, which can be obtained by logging into a target 2, before issuing a command ORB, the description of that operation will be omitted herein.

(1) The CPU 10 sets the address of the CommandAgent register obtained from the target 2 and the node ID of the target 2 in the sequence control circuit 29 and sets the address of a status reception buffer (STATUS_FIFO) in the status reception buffer for command 33 as initial settings. The node ID of the target 2 is the same as the value used in issuing a management ORB. Therefore, if the management ORB has been previously issued, setting of the node ID may be omitted. If the command ORB is issued a second or subsequent time, setting of the addresses of the CommandAgent register and STATUS_FIFO also may be omitted.

(2) The CPU 10 generates the command ORB to be issued and stores it in the command ORB transmission buffer 30. The command ORB transmission buffer 30 decides the address (*P in FIG. 10) of the command ORB and communicates it to the sequence control circuit 29. It also communicates the address to the packet processing circuit 28 and the reception filter 27.

Figure 10:
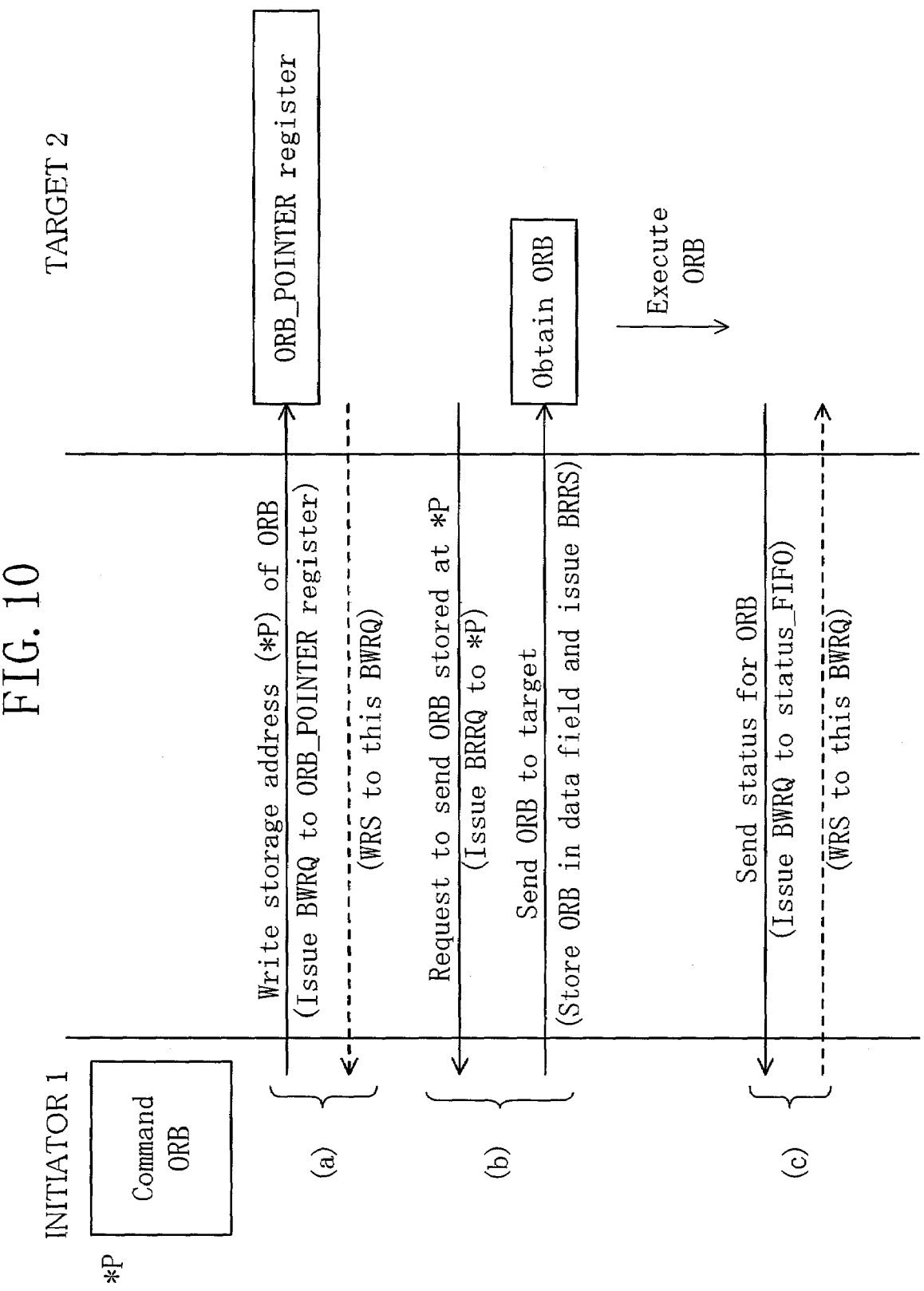
FIG. 10 shows a command ORB issue sequence performed by the command issuing apparatus shown in FIG. 7.
Figure 11A:
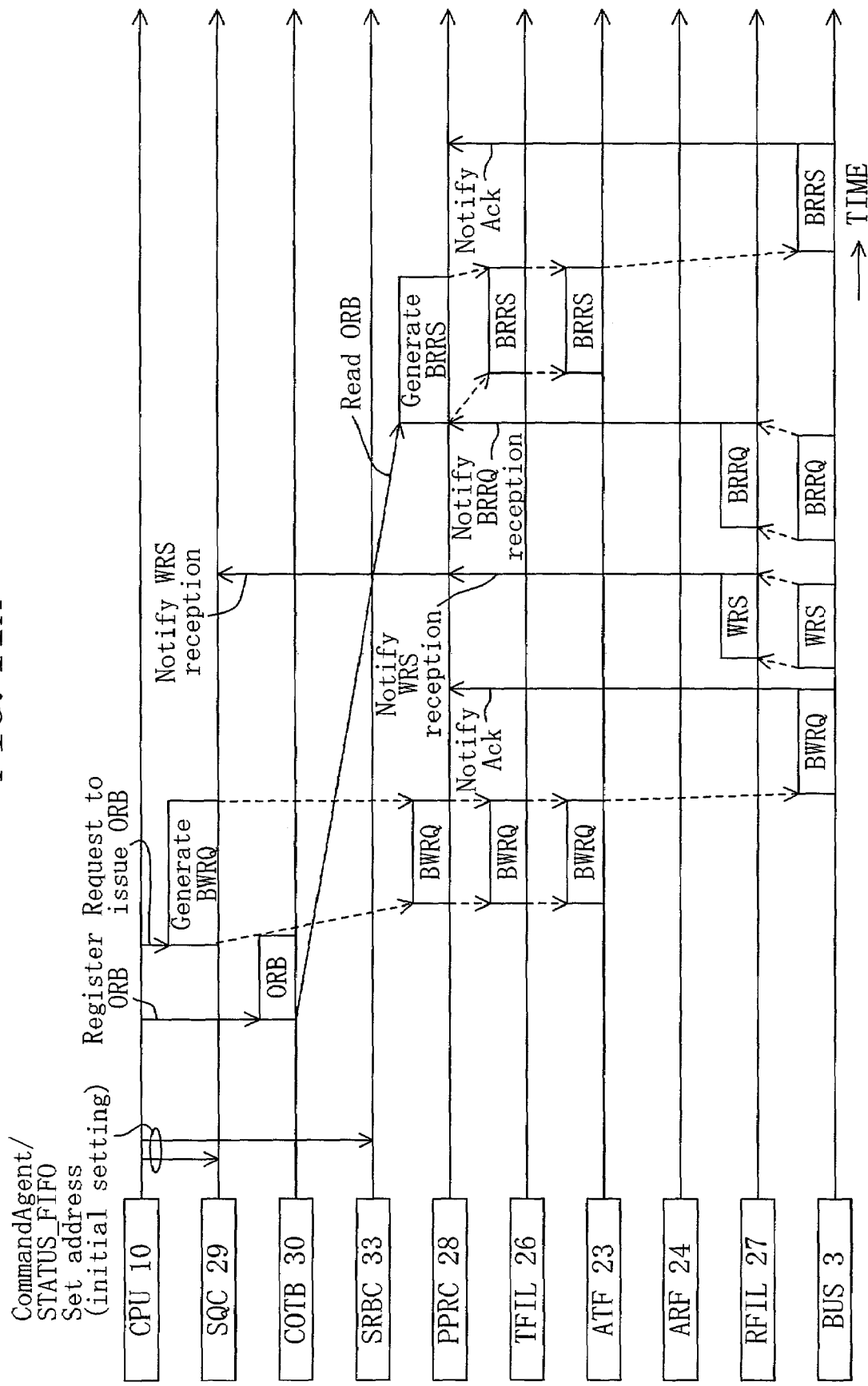
FIG. 11A shows a timing chart indicating operations of the components shown in FIG. 7 when a command ORB is issued.
Figure 11B:
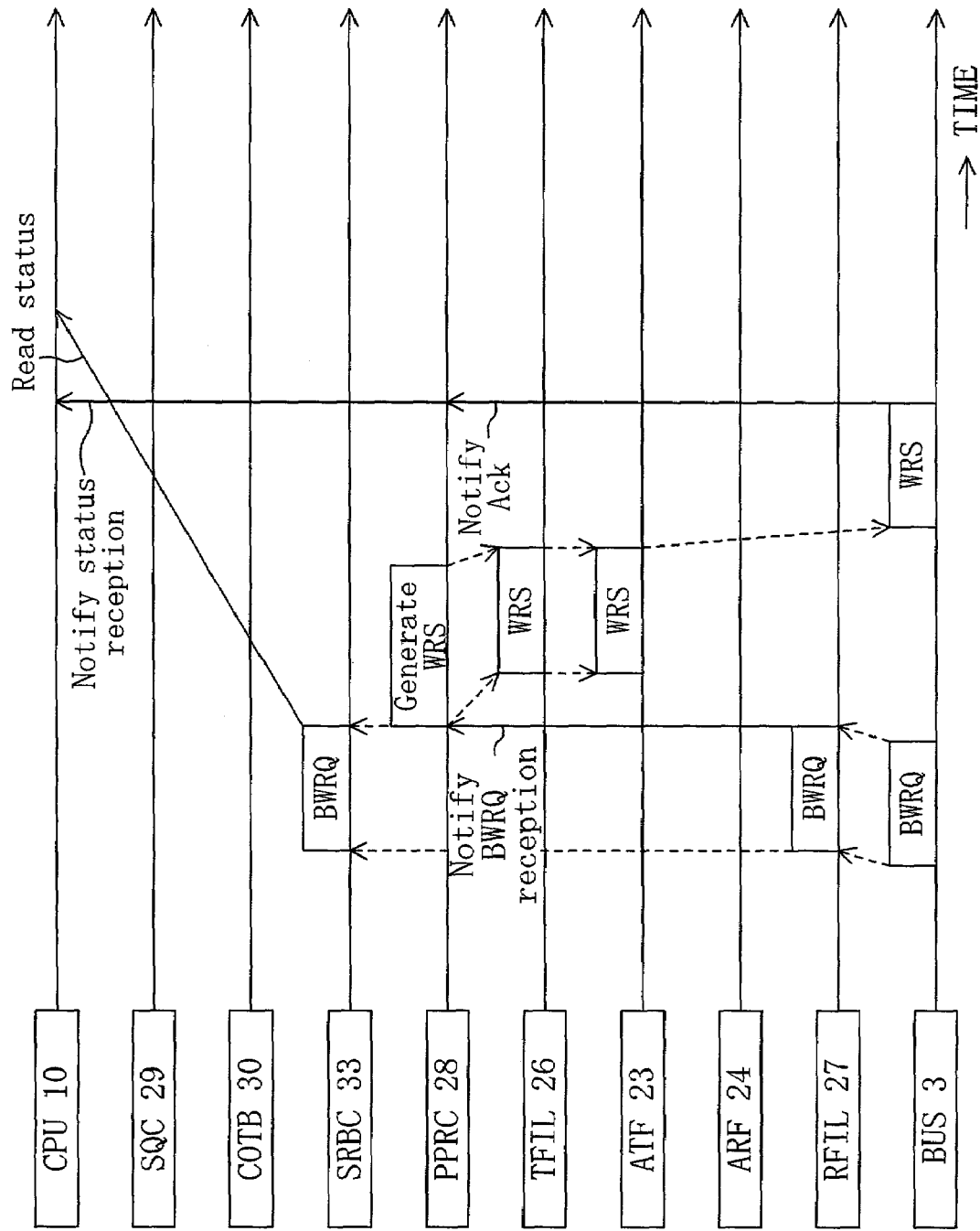
FIG. 11B shows a timing chart continued from FIG. 11A.

(3) The CPU 10 requests the sequence control circuit 29 to issue the command ORB (phase "a" in FIG. 10 starts).

(4) The sequence control circuit 29 generates a BWRQ packet shown in FIG. 1A in which the node ID of the target 2 provided from the CPU 10 is set in destination_ID, the address of an ORB_POINTER register is set in destination_offset, the address (*P) of the command ORB provided from the command ORB transmission buffer 30 is set in data_field, tcode is set to "1" (indicating that this is a BWRQ packet), and data_length is set to "8". Then the sequence control circuit 29 provides the BWRQ packet to the packet processing circuit 28.

(5) The packet processing circuit 28 sets a given value in tl in the BWRQ packet and sends out the BWRQ packet onto the 1394 bus 3 through the transmission filter 26, transmission buffer 23, link-layer controller 22, and physical-layer controller 21. The packet processing circuit 28 communicates tcode and tl to the reception filter 27.

(6) The target 2 receives the BWRQ packet and returns a WRS packet.

(7) If the reception filter 27 determines that tcode in the WRS packet it received is WRS and that tl matches the one provided from the packet processing circuit 28, then it notifies the packet processing circuit 28 and the sequence control circuit 29 of the reception of the WRS packet and discards the WRS packet itself (phase "a" in FIG. 10 ends).

(8) Then, the target 2 sends a BRRQ packet to the address (*P) of the command ORB in order to obtain the command ORB. If the reception filter 27 determines that destination_offset of the received BRRQ packet matches the address (*P) of the command ORB communicated from the packet processing circuit 28, then it communicates the reception of the BRRQ packet and tl to the packet processing circuit 28 and discards the BRRQ packet itself (phase "b" in FIG. 10 starts).

(9) The packet processing circuit 28 reads the command ORB from the command ORB transmission buffer 30 and places it in data_field to generate a BRRS packet. Then, the packet processing circuit 28 changes tl of the BRRS packet to tl received from the reception filter 27 and sends out it onto the 1394 bus 3 through the transmission filter 26, transmission buffer 23, link-layer controller 22, and physical-layer controller 21.

(10) The target 2 receives the BRRS packet to obtain the command ORB and executes it (phase "b" in FIG. 10 ends).

(11) After the completion of the execution of the ORB, the target 2 generates a status shown in FIG. 4, places it in data_field in the BWRQ packet, and sends it to the initiator 1 (phase "c" in FIG. 10 starts).

(12) If the reception filter 27 determines that the destination_offset in the BWRQ packet containing the status matches the address in the STATUS_FIFO set in the CPU 10, then it notifies the packet processing circuit 28 of the reception of the BWRQ packet and provides the BWRQ packet to the packet processing circuit 28.

(13) The packet processing circuit 28 references ORB_offset_hi and ORB_offset_lo (see FIG. 4) in the status contained in data_field in the BWRQ packet and, if they do not mach the address of the management ORB received from the management ORB transmission buffer 31, stores the status in the status reception buffer for command 33. At the same time, it generates a WRS packet for the BWRQ packet and sends out it onto the 1394 bus 3 through the transmission filter 26, transmission buffer 23, link-layer controller 22, and physical layer controller 21.

(14) If the packet processing circuit 28 determines that information in an ACK packet for the transmitted WRS packet indicates a normal end, then it notifies the CPU 10 of the reception of the status for the command ORB (phase "c" in FIG. 10 ends).

(15) The CPU 10 reads the status from the status reception buffer for command 33.

Thus, the command issuing apparatus 20 can eliminates the load which would be placed on the CPU 10 during the period until it receives the notification of the reception of the status and reads the status after it performs the initial setting, generates and stores a command ORB, and requests the issue of the command ORB. While operation for issuing the command ORB through access to the ORB_POINTER register has been described with respect to the exemplary operation, similar functions are performed in issuing a command ORB through access to the DOORBELL register while AGENT_STATE is SUSPEND.

(Third Exemplary Operation)

An operation of the command issuing apparatus 20 when issuing linked command ORBs will be described below with reference to FIGS. 12A-12B and 13A-13C. In this example, an operation before the command C in FIG. 5 is added, that is, an operation for issuing two command ORBs of command A and command B, will be described.

In this exemplary operation, the CPU 10 generates two command ORBs (ORB A, ORB B) to be issued and stores them in the command ORB transmission buffer 30 in sequence. The command ORB transmission buffer 30 decides the address of the ORB of command A ("*A" in FIG. 12A) and communicates it to the sequence control circuit 29. It also communicates the address to the packet processing circuit 28 and the reception filter 27. Then, the command ORB transmission buffer 30 decides the address of the ORB of command B ("*B" in FIG. 12A) and changes the next_ORB field of the ORB of command A to "*B". As with the ORB of command A, it communicates the address ("*B" in FIG. 12A) of the ORB of command B to the packet processing circuit 28 and the reception filter 27.

Figure 12A:
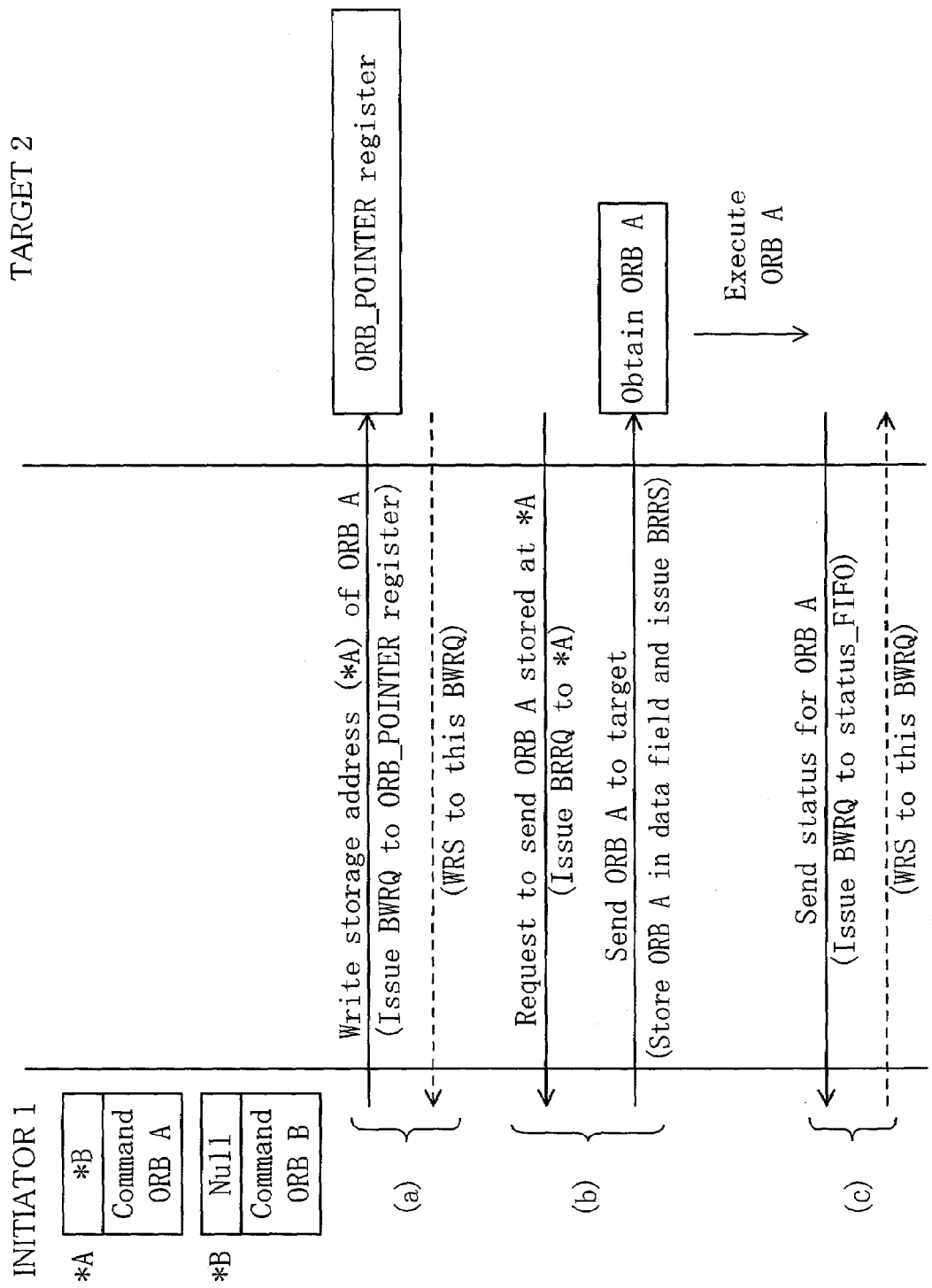
FIG. 12A shows a sequence for issuing linked command ORBs performed by the command issuing apparatus shown in FIG. 7.

The process from phase "a" to phase "c" in FIG. 12A proceeds as in the second exemplary operation. When the CPU 10 is notified of the reception of status for the ORB of command A, the CPU 10 reads the status from the status reception buffer for command 33. Alternatively, a plurality of statuses may be stored at a time in the status reception buffer for command 33, thereby allowing the read of the status for the ORB of command A by the CPU 10 to be postponed until a status for the ORB of command B is read.

Figure 12B:
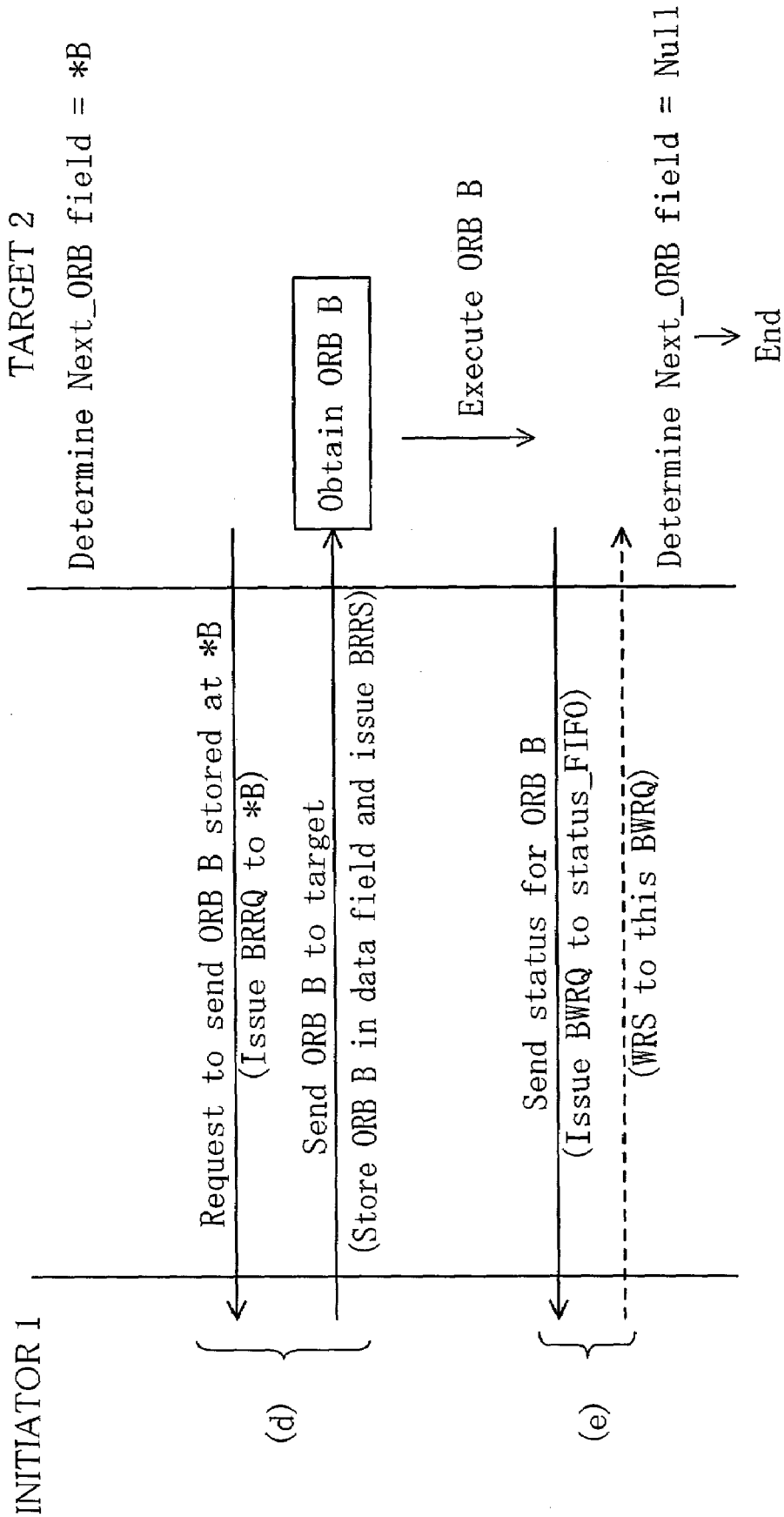
FIG. 12B shows a sequence diagram continued from FIG. 12A.
Figure 13A:
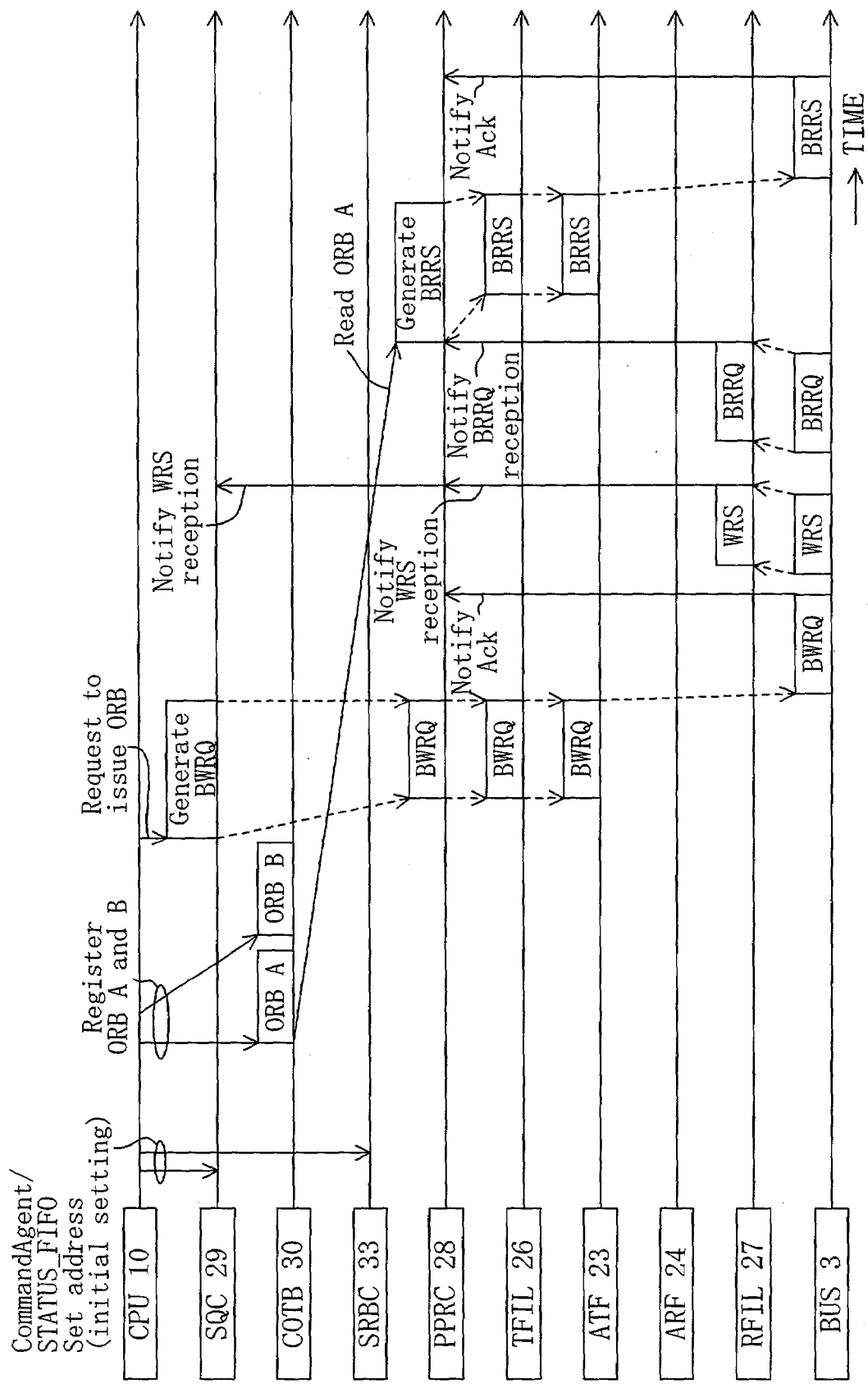
FIG. 13A shows a timing chart indicating operations of the components shown in FIG. 7 when the linked command ORBs are issued.
Figure 13C:
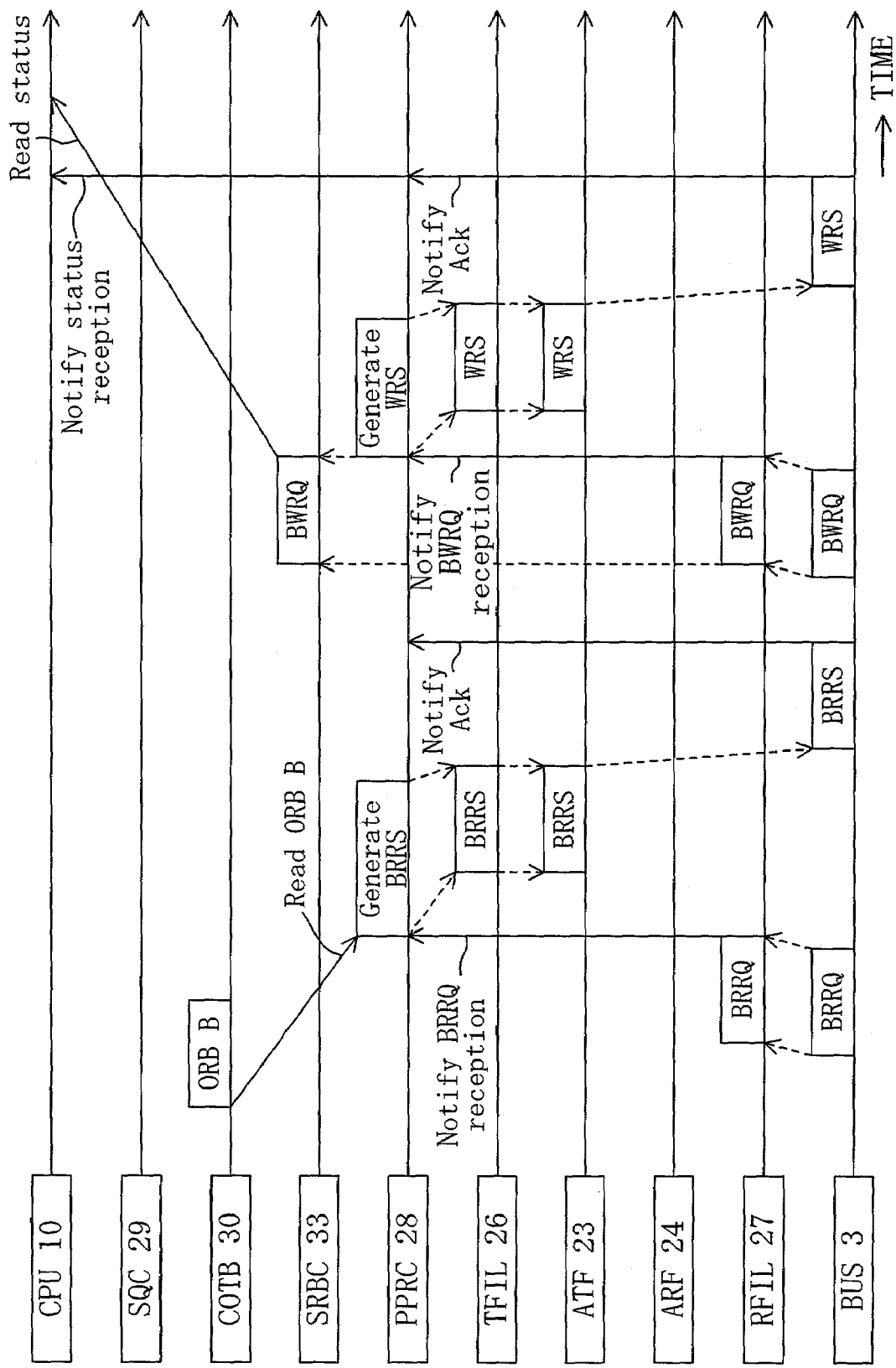
FIG. 13C shows a timing chart continued from FIG. 13B.

The target 2 determines that the next_ORB field in the ORB of command A is not Null but *B. Thus, the ORB of command B is obtained and the execution of it is started. Phases d and e in FIG. 12B are the same as phases b and c in FIG. 12A.

As described above, the command issuing apparatus 20 allows the CPU 10 to buffer a plurality of command ORBs with leaving their next_ORB field Null rather than intentionally linking the ORBs when the CPU 10 issues the command ORBs, thereby reducing the load on the CPU 10.

(Fourth Exemplary Operation)

An operation of the command issuing apparatus 20 when an additional command ORB is issued during the execution of a linked command ORB will be described below with reference to FIGS. 14A–14B and 15A–15D. In this example, an operation for an additional command C is issued during the execution of command A after two ORBs for commands A and B are linked and issued as shown in FIG. 5.

Figure 14A:
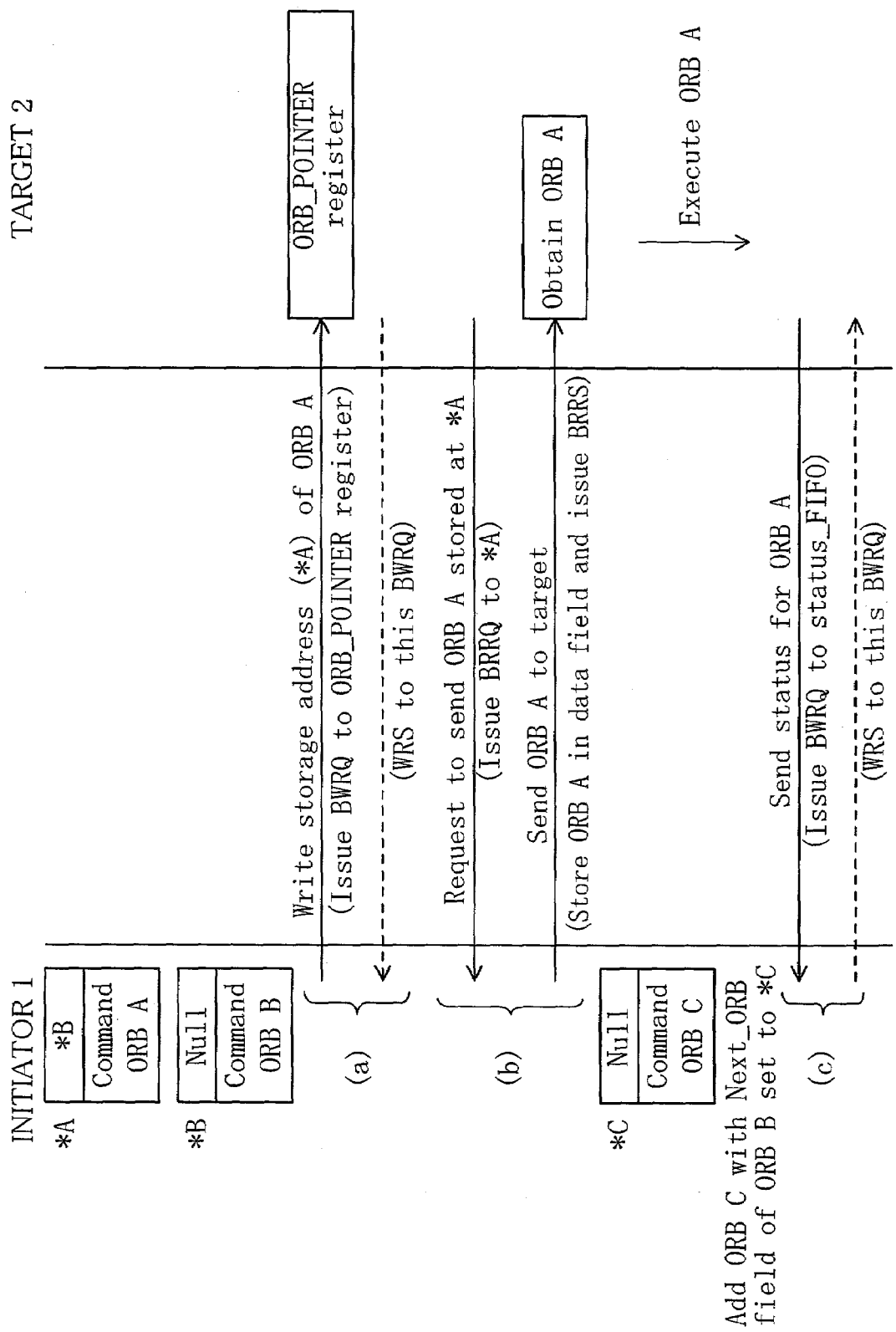
FIG. 14A shows a sequence for issuing an additional command ORB by the command issuing apparatus shown in FIG. 7 during the execution of linked command ORBs.
Figure 15A:
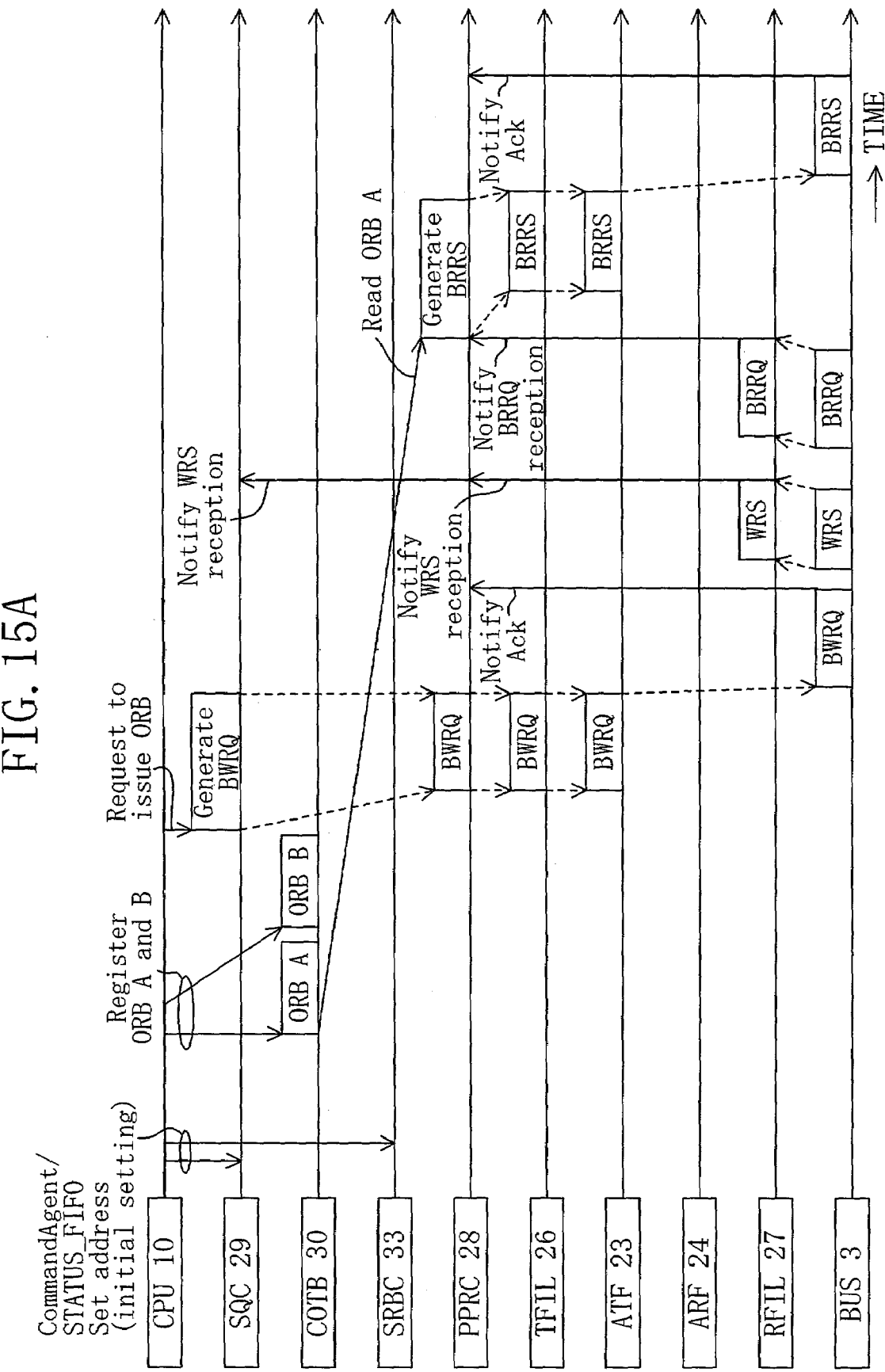
FIG. 15A shows a timing chart indicating operations of the components shown in FIG. 7 when the additional command ORB is issued during the execution of the linked command ORBs.
Figure 15B:
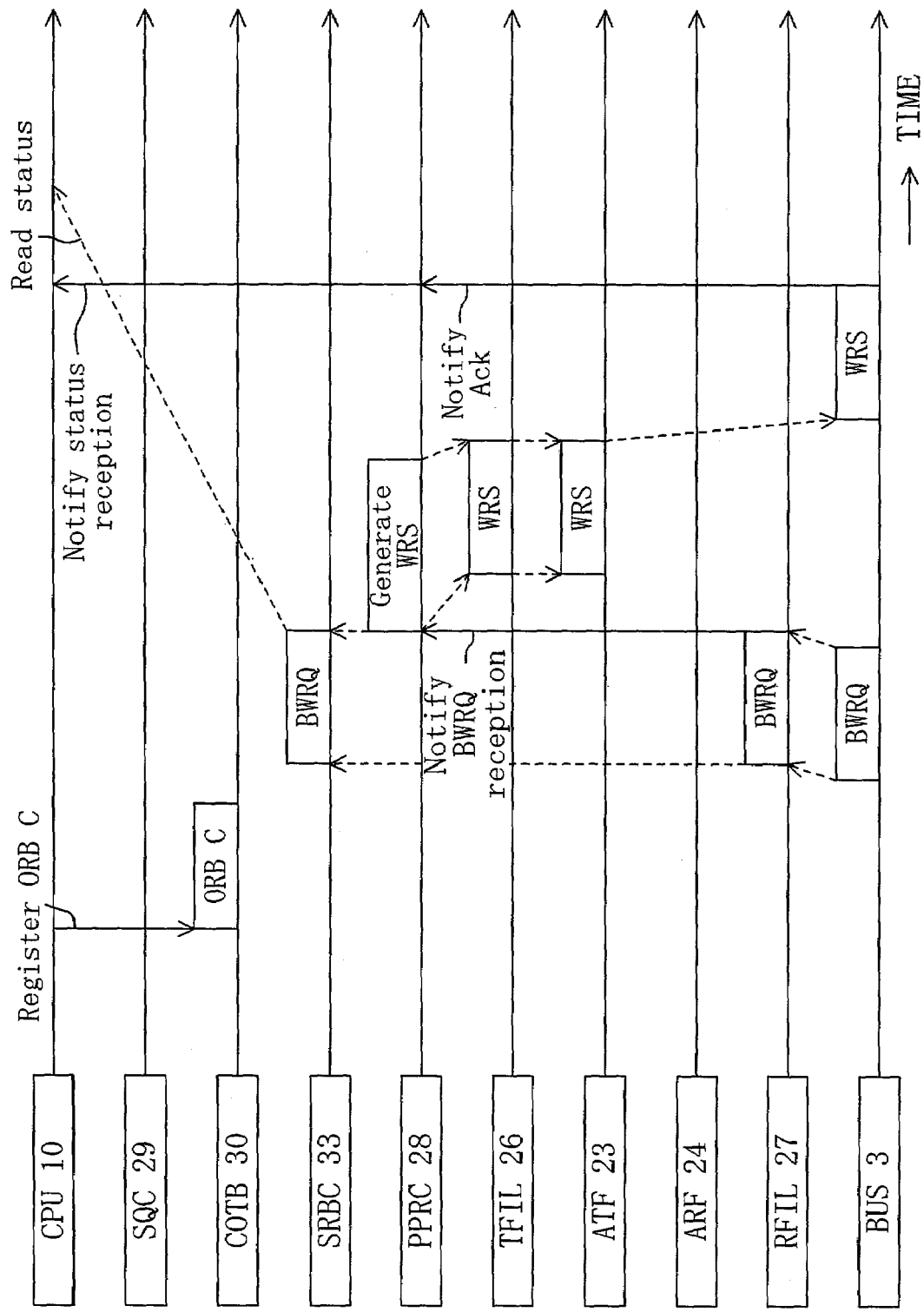
FIG. 15B shows a timing chart continued from FIG. 15A.
Figure 15C:
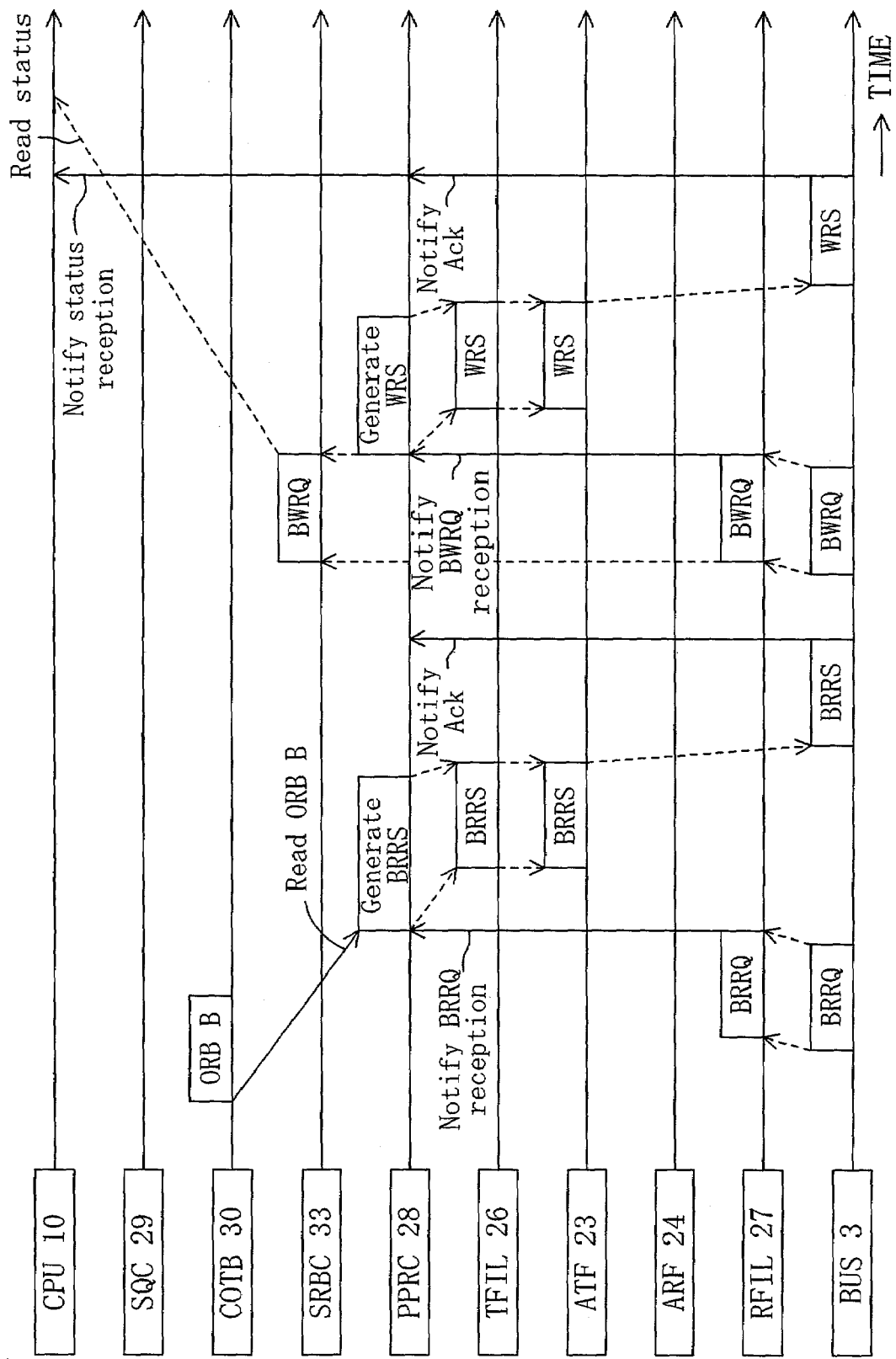
FIG. 15C shows a timing chart continued from FIG. 15B.
Figure 15D:
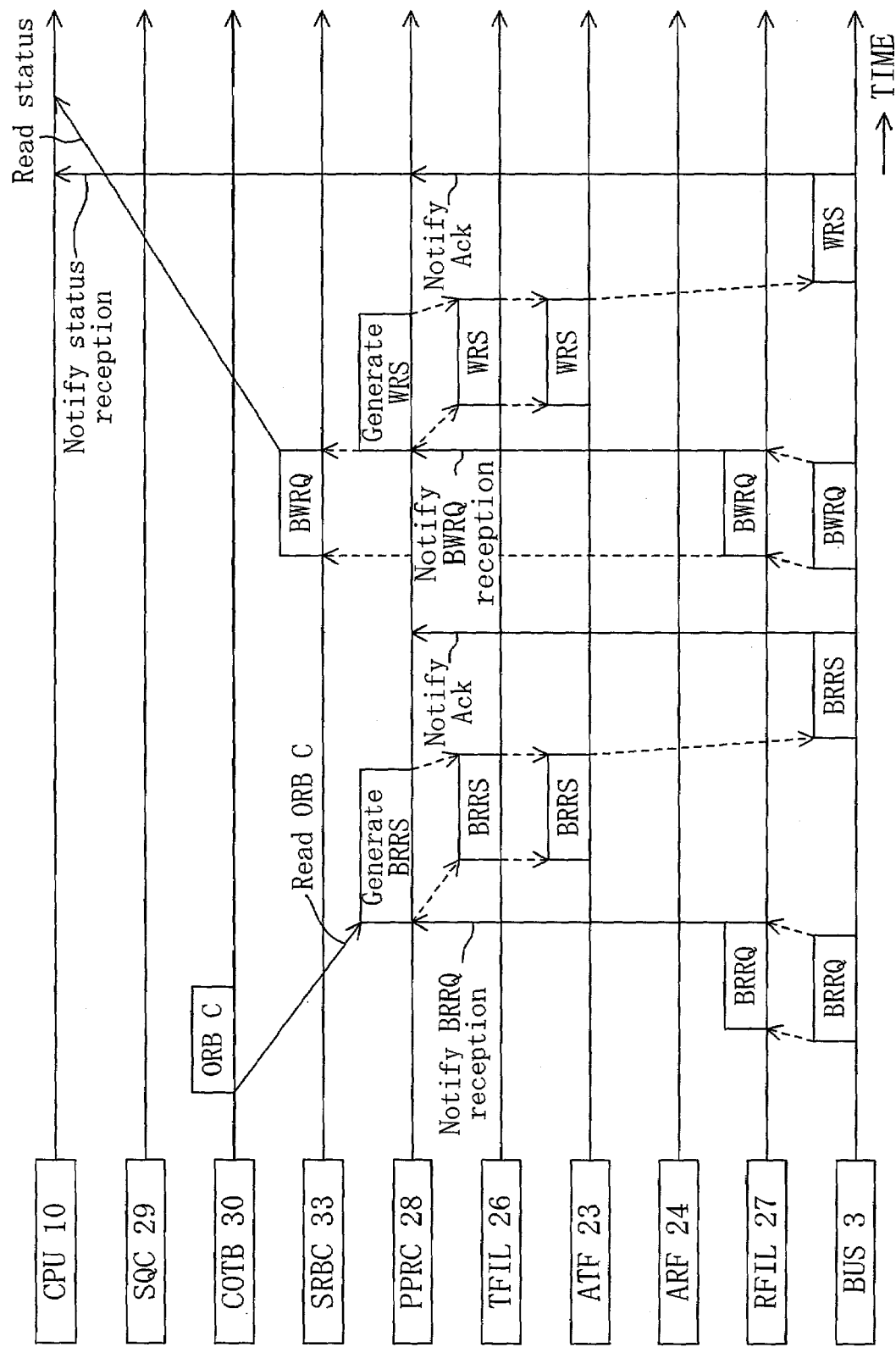
FIG. 15D shows a timing chart continued from FIG. 15C.

Phases a and b in FIG. 14A proceed as those in the third exemplary operation. The CPU 10 generates the ORB of the third command, C, and stores it in the command ORB transmission buffer 30 during the execution of the ORB of command A. The command ORB transmission buffer 30 decides the address (*C in FIG. 14A) of the ORB of command C and communicates it to the packet processing circuit 28 and the reception filter 27. The command ORB transmission buffer 30 changes the next_ORB field of the ORB of command B buffered previously to "*C" and requests the sequence control circuit 29 to access the DOORBELL register of the target 2. The sequence control circuit 29 does not access the DOORBELL register because the ORB of command A is being executed. However, if the last ORB linked, the ORB of command B, is being executed, it accesses the DOORBELL register.

The description of phase c in FIG. 14A and phases d through g in FIG. 14B would not be needed. Also in this example, a plurality of statuses may be stored at a time in the status reception buffer for command 33 so that the read of the status for the ORBs of commands A and B by the CPU 10 can be postponed until a status for the ORB of command C is read.

In this way, the command issuing apparatus 20 allows, when the CPU 10 issues an additional command ORB during the execution of a plurality of linked command ORBs issued, the CPU 10 to buffer all the command ORBs with leaving their next_ORB field Null rather than intentionally linking the ORBs, thereby reducing the load on the CPU 10.

(Fifth Exemplary Operation)

An operation of the command issuing apparatus 20 in a case where a command error occurs will be described below with reference to FIGS. 16 and 17A–17B. Transition to the DEAD state and a return to the RESET state will be described herein.

Figure 16:
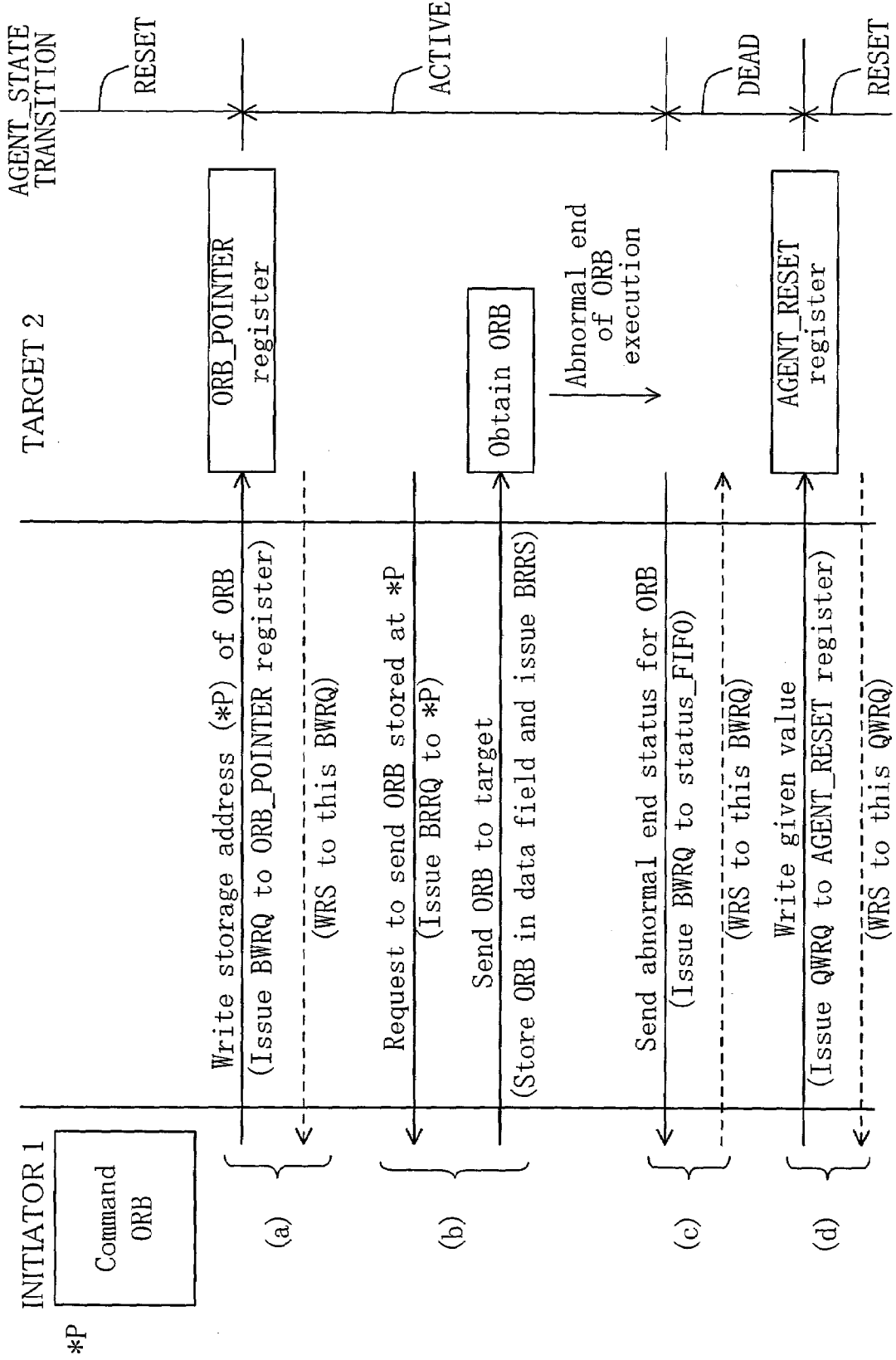
FIG. 16 shows an operation sequence performed in the command issuing apparatus shown in FIG. 7 if command error occurs.
Figure 17A:
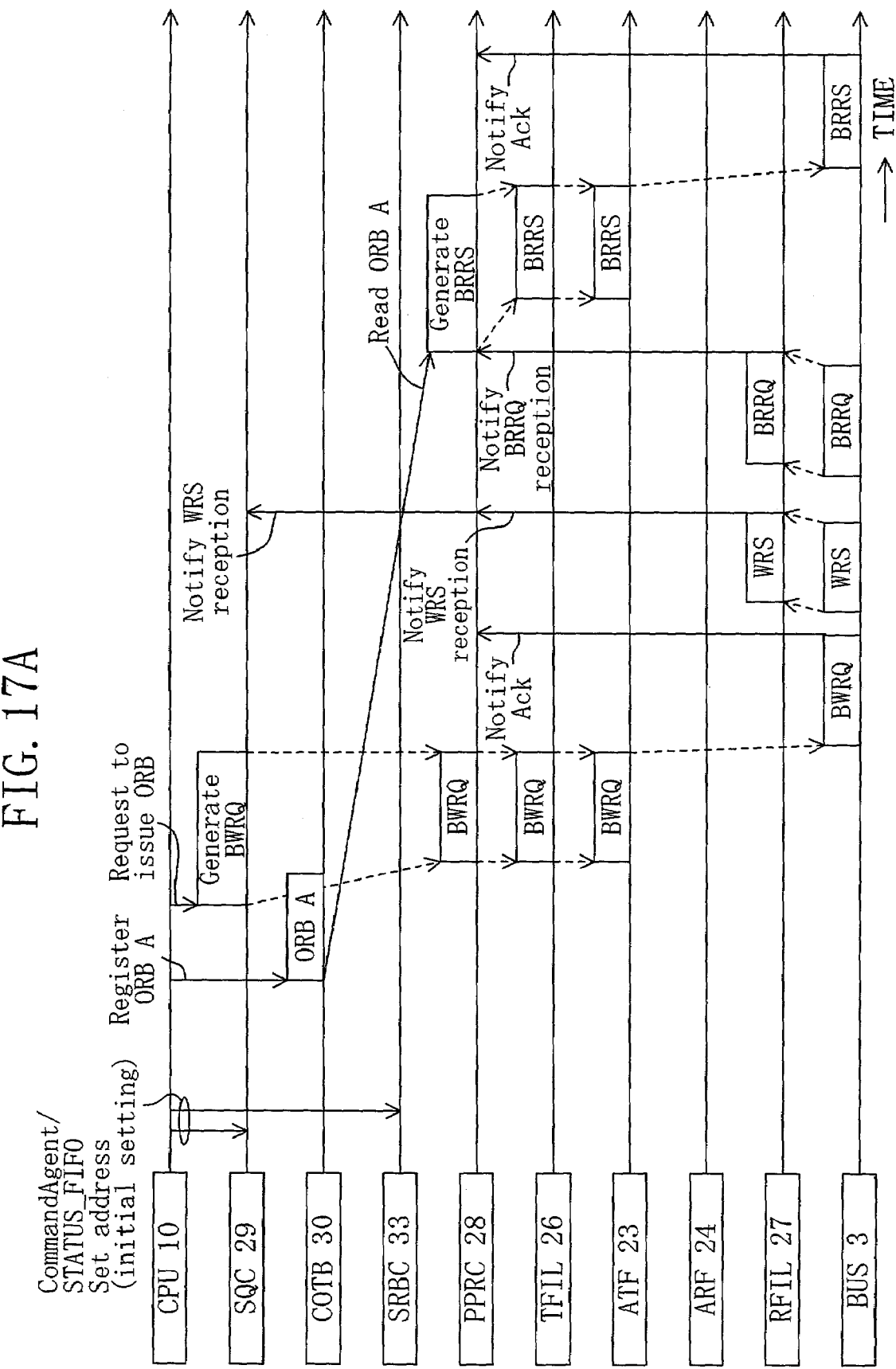
FIG. 17A shows a timing chart of the components shown in FIG. 7 when the command error occurs.
Figure 17B:
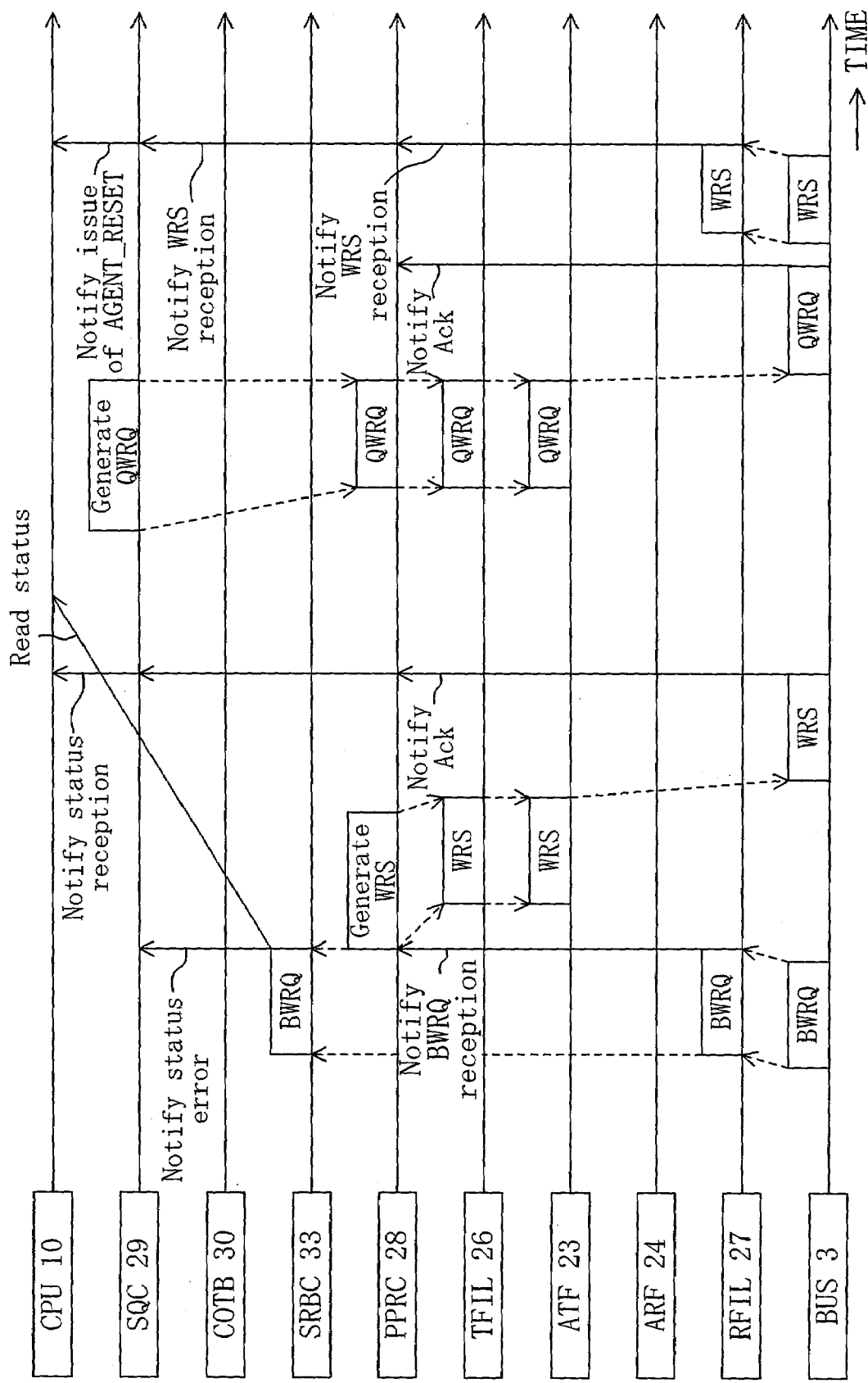
FIG. 17B shows a timing chart continued from FIG. 17A.

Phases a and b in FIG. 16 proceed as in the second exemplary operation. After the target 2 returns a WRS packet to the initiator 1 in phase "a" in FIG. 16, it makes transition from the RESET state to the ACTIVE state. If an error occurs while the target 2 is executing an ORB, the target 2 generates an error status according to the format shown in FIG. 4, places it in data_field in a BWRQ packet, and sends it to the initiator 1. The error status is generated by setting bit "d" in FIG. 4. Then, the target 2 enters the DEAD state (phase "c" in FIG. 16 starts).

Phases c and d in FIG. 16 will be detailed below.

(1) If the reception filter 27 determines that destination_offset in the BWRQ packet containing the received error status matches the address in STATUS_FIFO set in the CPU 10, then it notifies the packet processing circuit 28 of the reception of the BWRQ packet and provides the BWRQ packet to the packet processing circuit 28.

(2) The packet processing circuit 28 references ORB_offset_hi and ORB_offset_lo in the status (see FIG. 4) contained in the data_field in the BWRQ packet and, if they do not match the address of a management ORB received from the management ORB transmission buffer 31, stored the status in the status reception buffer for command 33. At the same time, it generates a WRS packet for the BWRQ packet and sends out it onto the 1394 bus 3 through the transmission filter 26, transmission buffer 23, link-layer controller 22, and physical-layer controller 21.

(3) If the packet processing circuit 28 determines that information in an ACK packet responding to the sent WRS packet indicates that a successful termination, it notifies the CPU 10 of the reception of the status for the command ORB (phase "c" in FIG. 16 ends).

(4) If the status reception buffer for command 33 storing the status determines that bit "d" in the status shown in FIG. 4 is set, it requests the sequence control circuit 29 to access the AGENT_RESET register of the target 2.

(5) The CPU 10 reads the status from the status reception buffer for command 33.

(6) When the sequence control circuit 29 receives the request to access the AGENT_RESET register, it generates a QWRQ packet shown in FIG. 1B in which the node ID of the target 2 provided by the CPU 10 is set in destination_ID, the address in the AGENT_RESET register is set in destination_offset, a given value is set in quadlet_data, and tcode is set to "0", then provides the QWRQ packet to the packet processing circuit 28 (phase "d" in FIG. 16 starts).

(7) The packet processing circuit 28 sets a given value in tl in the QWRQ packet and sends out it onto the 1394 bus 3 through the transmission filter 26, transmission buffer 23, link-layer controller 22, and physical-layer controller 21. The packet processing circuit 28 communicates the tcode and tl to the reception filter 27.

(8) The target 2 receives the QWRQ packet and returns a WRS packet. Then the target 2 enters the RESET state.

(9) If the reception filter 27 determines that tcode in the received WRS packet is WRS and tl matches one provided from the packet processing circuit 28, it notifies the packet processing circuit 28 and the sequence control circuit 29 of the reception of the WRS packet and discard the WRS packet itself (phase "d" in FIG. 16 ends).

(10) The sequence control circuit 29 notifies the CPU 10 of the access to the AGENT_RESET register.

As described above, the command issuing apparatus 20 eliminates the need for the CPU 10 to perform the action of changing the target 2 to the RESET state even if the target 2 makes transition to the DEAD state because of an abnormal end of an issued command ORB, thereby reducing the load on the CPU 10. In addition, if an error occurs while linked command ORBs are being executed, the command issuing apparatus 20 can continue to issue stored command ORBs by accessing the ORB_POINTER register once it accesses the AGENT_RESET register, therefore the CPU 10 can continue issuing command ORBs.

What is claimed is:

1. A command issuing apparatus as an initiator in a high-speed serial interface for issuing a command to a target by using a packet, comprising:

a sequence control circuit activated by a central processing unit (CPU) for controlling a command issue sequence;

a packet processing circuit for assembling operation request blocks (ORB) to be issued into a transmission packet and extracting a status from a received packet;

a command ORB transmission buffer for storing a command ORB provided by said CPU;

a management ORB transmission buffer for storing a management ORB provided by said CPU;

a status reception buffer for management for storing a status received for an issued management ORB and providing the status to said CPU; and a status reception buffer for command for storing a status received for an issued command ORB and providing the status to said CPU, wherein said command ORB transmission buffer has a capacity for storing a plurality of command ORBs at a time, and wherein said command ORB transmission buffer automatically assigns and rewrites an address into a next_ORB field so that a plurality of ORBs to be stored are linked even if the next_ORB field is null.

2. A command issuing apparatus as an initiator in a high-speed serial interface for issuing a command to a target by using a packet, comprising:
  a sequence control circuit activated by a central processing unit (CPU) for controlling a command issue sequence;
  a packet processing circuit for assembling operation request blocks (ORB) to be issued into a transmission packet and extracting a status from a received packet;
  a command ORB transmission buffer for storing a command ORB provided by said CPU;
  a management ORB transmission buffer for storing a management ORB provided by said CPU;
  a status reception buffer for management for storing a status received for an issued management ORB and providing the status to said CPU; and
  a status reception buffer for command for storing a status received for an issued command ORB and providing the status to said CPU,
  wherein said command ORB transmission buffer has a capacity for storing a plurality of command ORBs at a time, and
  wherein said command ORB transmission buffer rewrites the next_ORB field to link the ORBs, and then requests said sequence control circuit to access a DOORBELL register of said target when a new command ORB is stored during the execution of a command ORB; and
  said sequence control circuit generates and issues a packet accessing said DOORBELL register in response to the request from said command ORB transmission buffer.

3. A command issuing apparatus as an initiator in a high-speed serial interface for issuing a command to a target by using a packet, comprising:
  a sequence control circuit activated by a central processing unit (CPU) for controlling a command issue sequence;
  a packet processing circuit for assembling operation request blocks (ORB) to be issued into a transmission packet and extracting a status from a received packet;
  a command ORB transmission buffer for storing a command ORB provided by said CPU;
  a management ORB transmission buffer for storing a management ORB provided by said CPU;
  a status reception buffer for management for storing a status received for an issued management ORB and providing the status to said CPU; and
  a status reception buffer for command for storing a status received for an issued command ORB and providing the status to said CPU,
  wherein said command ORB transmission buffer, by itself, automatically assigns and rewrites an address into a next_ORB field without an operation of the CPU.

4. A command issuing apparatus as an initiator in a high-speed serial interface for issuing a command to a target by using a packet, comprising:
  a sequence control circuit activated by a central processing unit (CPU) for controlling a command issue sequence;
  a packet processing circuit for assembling operation request blocks (ORB) to be issued into a transmission packet and extracting a status from a received packet; and
  a command ORB transmission buffer for storing a plurality of command ORBs provided by said CPU at a time;
  wherein said command ORB transmission buffer, by itself, assigns and rewrites an address into a next_ORB field of command ORB which is stored in the end of said command ORB transmission buffer so that a plurality of ORBs are linked when the CPU issues an additional command ORB during an execution of a plurality of linked command ORB.

5. A command issuing apparatus as an initiator in a high-speed serial interface for issuing a command to a target by using a packet, comprising:
  a sequence control circuit activated by a central processing unit (CPU) for controlling a command issue sequence;
  a packet processing circuit for assembling operation request blocks (ORB) to be issued into a transmission packet and extracting a status from a received packet; and
  a command ORB transmission buffer for storing a plurality of command ORBs provided by said CPU at a time;
  wherein said command ORB transmission buffer rewrites a next_ORB field of a command ORB in said command ORB buffer from null to an address of a new command ORB to link the ORBs, and then requests said sequence control circuit to access a DOORBELL register of said target when the new command ORB is stored during the execution of a command ORB; and
  said sequence control circuit generates and issues a packet accessing said DOORBELL register in response to the request from said command ORB transmission buffer.

* * * * *